Dec. 16, 1952 F. M. ZENNER ET AL 2,621,995
POWER-OPERATED VISIBLE INDEX

Filed May 24, 1950 11 Sheets-Sheet 1

INVENTORS
Frederick M. Zenner
BY Carl F. Wolters
ATTORNEY

Dec. 16, 1952 F. M. ZENNER ET AL 2,621,995
POWER-OPERATED VISIBLE INDEX
Filed May 24, 1950 11 Sheets-Sheet 3

INVENTORS
Frederick M. Zenner
Carl F. Wolters
BY
ATTORNEY

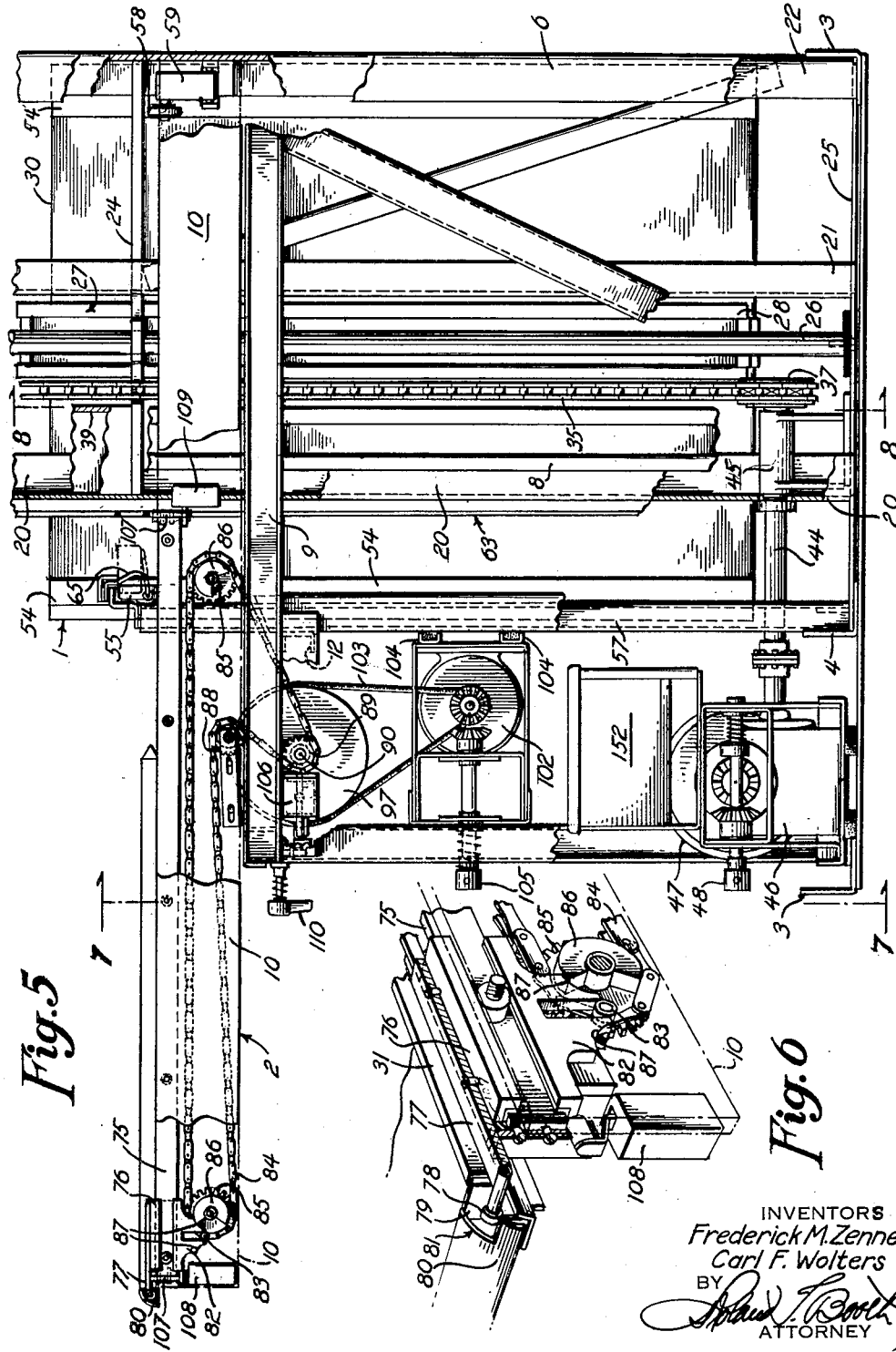

Dec. 16, 1952   F. M. ZENNER ET AL   2,621,995
POWER-OPERATED VISIBLE INDEX
Filed May 24, 1950   11 Sheets-Sheet 5
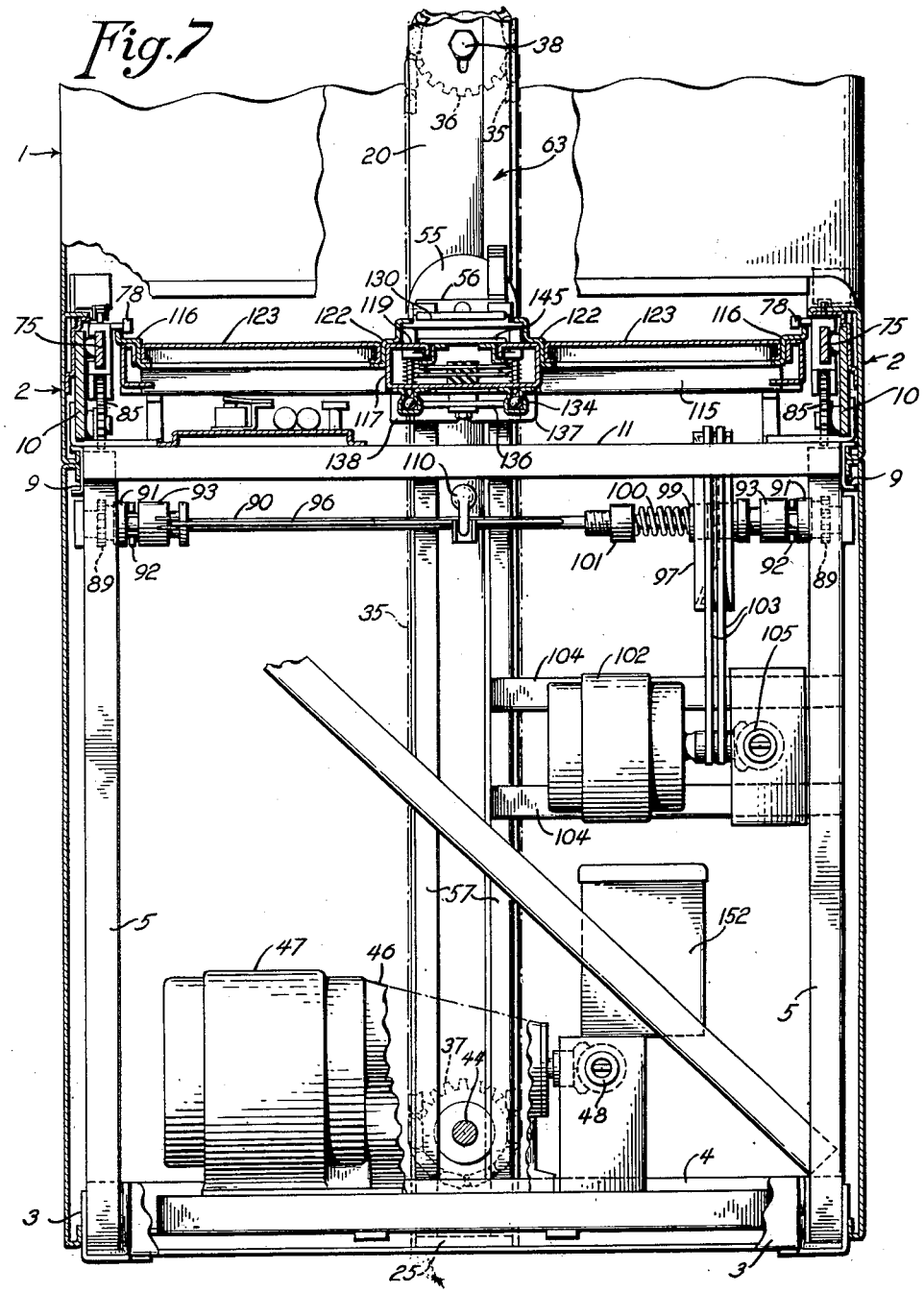

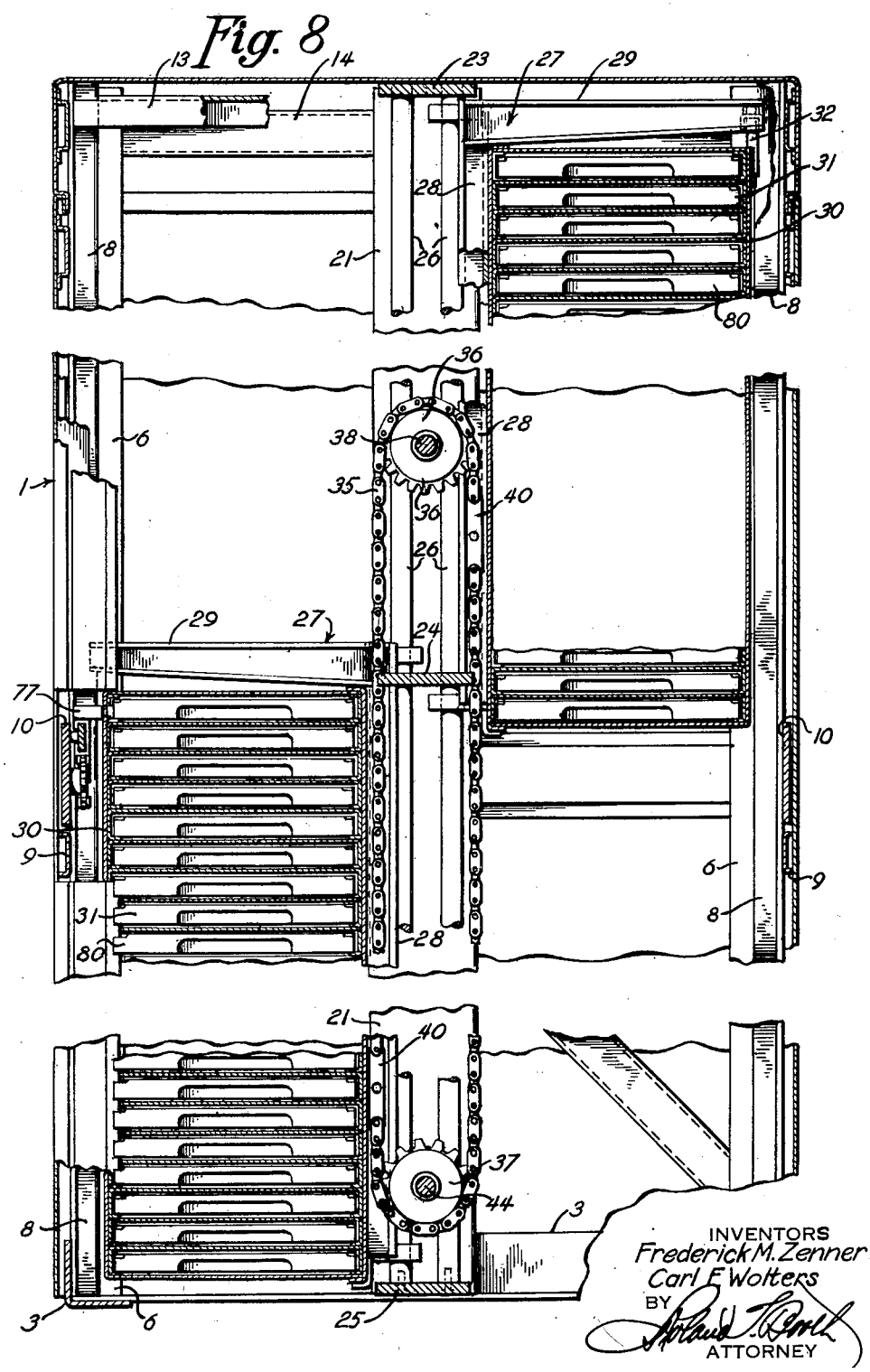

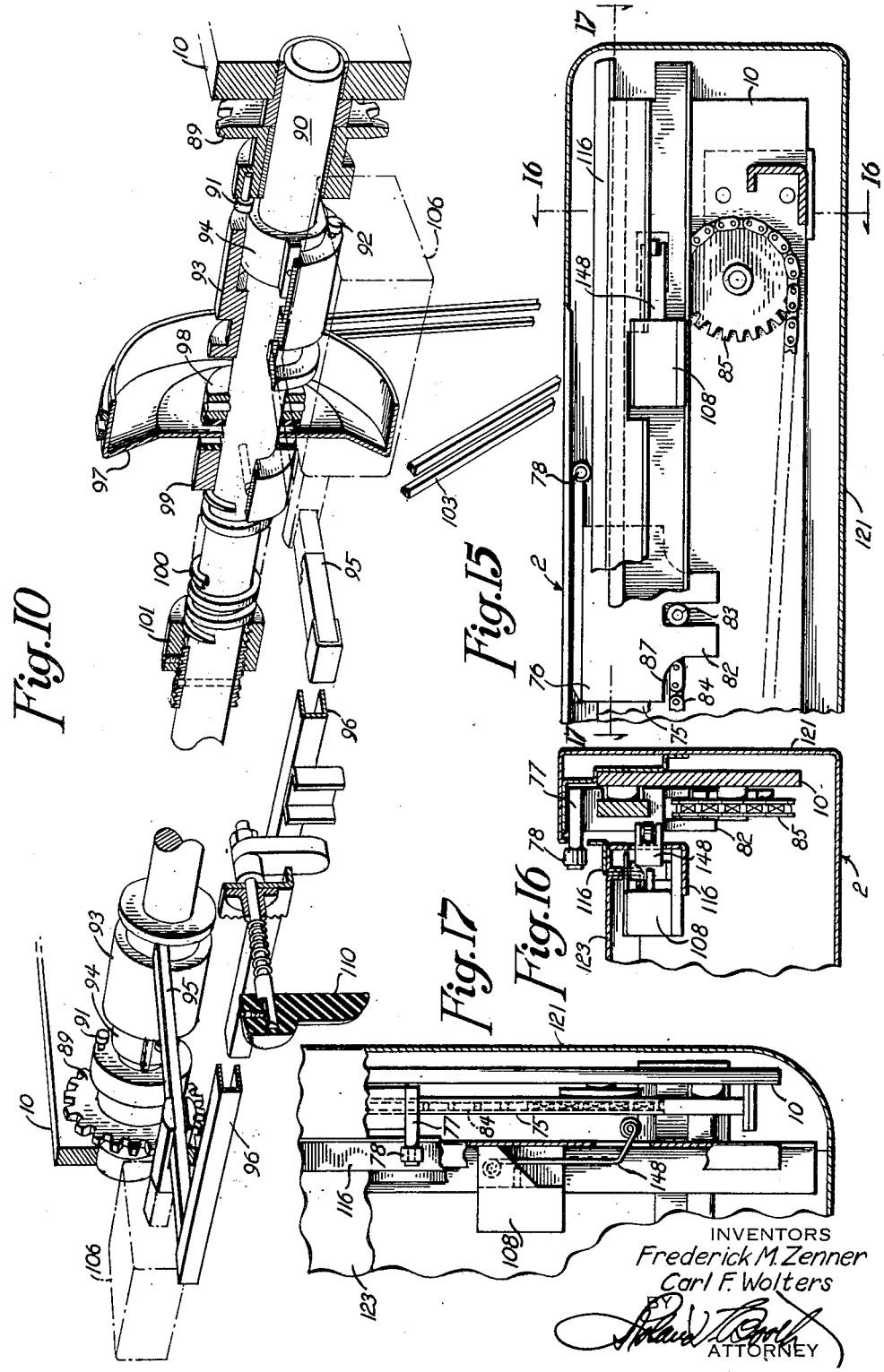

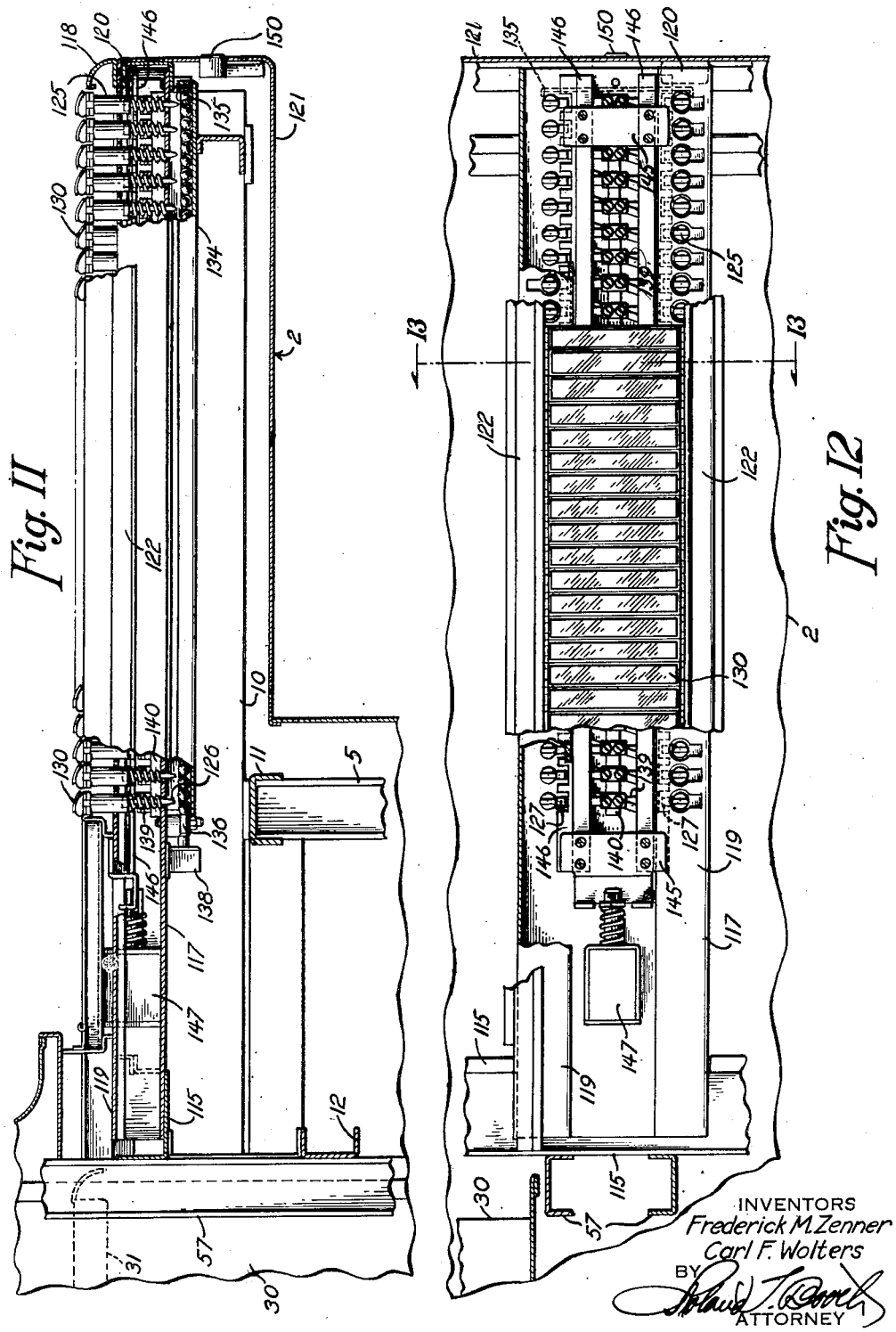

Dec. 16, 1952    F. M. ZENNER ET AL    2,621,995
POWER-OPERATED VISIBLE INDEX
Filed May 24, 1950    11 Sheets-Sheet 10

INVENTORS
Frederick M. Zenner
BY Carl F. Wolters
ATTORNEY

Patented Dec. 16, 1952

2,621,995

UNITED STATES PATENT OFFICE 2,621,995

POWER-OPERATED VISIBLE INDEX

Frederick M. Zenner, Marietta, Ohio, and Carl F. Wolters, New Canaan, Conn., assignors to Remington Rand Inc., New York, N. Y., a corporation of Delaware Application May 24, 1950, Serial No. 163,964

26 Claims. (Cl. 312—223)

The invention relates to a power operated visible index unit.

The invention provides a power operated visible index construction having a plurality of index buttons or keys, one for each tray, arranged at desk level and manually operable for individually actuating mechanism to move a cabinet for aligning a selected tray with a tray guide and moving the tray outwardly onto the tray guide at desk level for inspection. A unit is provided by the invention having a pair of cabinets simultaneously moved by a motor drive to position a selected tray, having a separate motor drive for moving the selected tray on tray guides for inspection at desk height and subsequently returning the tray from the tray guides into the cabinet.

The invention provides a chassis having cabinet supporting and guiding mechanism to slidably mount a pair of cabinets for vertical movement and align the compartments in the cabinet carrying a tray in each compartment with tray guides carried by a desk extension on the chassis, so that a selected tray may be moved outwardly from the cabinet onto the tray guides. An endless chain is mounted on the chassis and directly connected with an elevator motor drive for moving the cabinets vertically in aligning a tray with the tray guides. The cabinets counterbalance on the chain and the cabinet elevator motor drive employs a reversible motor to provide easy sliding of the cabinets in both directions.

The invention provides suitable means for adjusting the mounting of the cabinets on the chassis and motor driven chain mechanism so that each cabinet can have the compartments aligned with one of a pair of tray guides carried by the desk extension.

The invention provides a commutator mechanism having a commutator bar adjustably mounted on the chassis and a complementary commutator brush assembly mounted on one of the cabinets. This commutator bar and brush assembly is included in an electrical control circuit for controlling the cabinet elevator motor drive to secure both high and low speed movement of the cabinets on the chassis in aligning a selected tray with a tray guide. The commutator structure has suitable electrically controlled mechanism for slowing down the movement of the cabinet as it approaches alignment of a selected tray with a tray guide and is operable to secure movement of the cabinet in both directions on the chassis and to center a tray with a tray guide according to the adjusted position of the commutator bar on the chassis relative to the brush assembly on the cabinet. A keyboard having a key corresponding to each tray may have a key for a desired tray operated, after which the control mechanism operates to first return a projected tray from the tray guides into its compartment in the cabinet, then move the cabinet to align a selected tray with its tray guide and then move the tray outwardly onto the tray guide for inspection to complete a cycle of movement of the operating and control mechanism.

The invention provides a visible index cabinet construction wherein all of the mechanism is mounted so that it is readily accessible for inspection, adjustment, and replacement through removal of the outer casing sections.

In the drawings:

Fig. 5 is a side elevation looking at the right-hand side unit of the machine with the upper portion broken away, the casing panels removed and with other portions broken away and shown in section for convenience in illustrating the two motor drives, one for elevating the cabinet, and the other for moving the trays, the cabinet on the near side being omitted.

Fig. 6 is an enlarged fragmentary perspective showing portions of a tray, tray guide and tray carrier mechanism at the front right-hand side of the desk extension to illustrate details of construction.

Fig. 7 is a vertical cross-section with the upper portion of the cabinet omitted taken approximately on line 7—7 of Fig. 5.

Fig. 8 is a vertical transverse cross-section with portions broken away taken approximately on line 8—8 of Fig. 5.

Fig. 10 is an enlarged fragmentary perspective showing the clutch selector and drive mechanism for moving the trays in and out of the cabinets with portions shown in cross-section and the clutch part shown in separated inoperative relation for convenience in illustration.

Fig. 11 is an enlarged vertical longitudinal cross-section through the desk extension of the cabinet showing the keyboard assembly with portions broken away and shown in cross-section to illustrate details of construction.

Fig. 12 is a plan view of the keyboard assembly shown in Fig. 11.

Fig. 15 is a vertical longitudinal cross-section through the forward end of the desk extension showing a modified form of front control switch mounting for the tray carrier.

Fig. 16 is a cross-section taken on line 16—16 of Fig. 15.

Fig. 17 is a cross-section taken on line 17—17 of Fig. 15.

Figure 1:
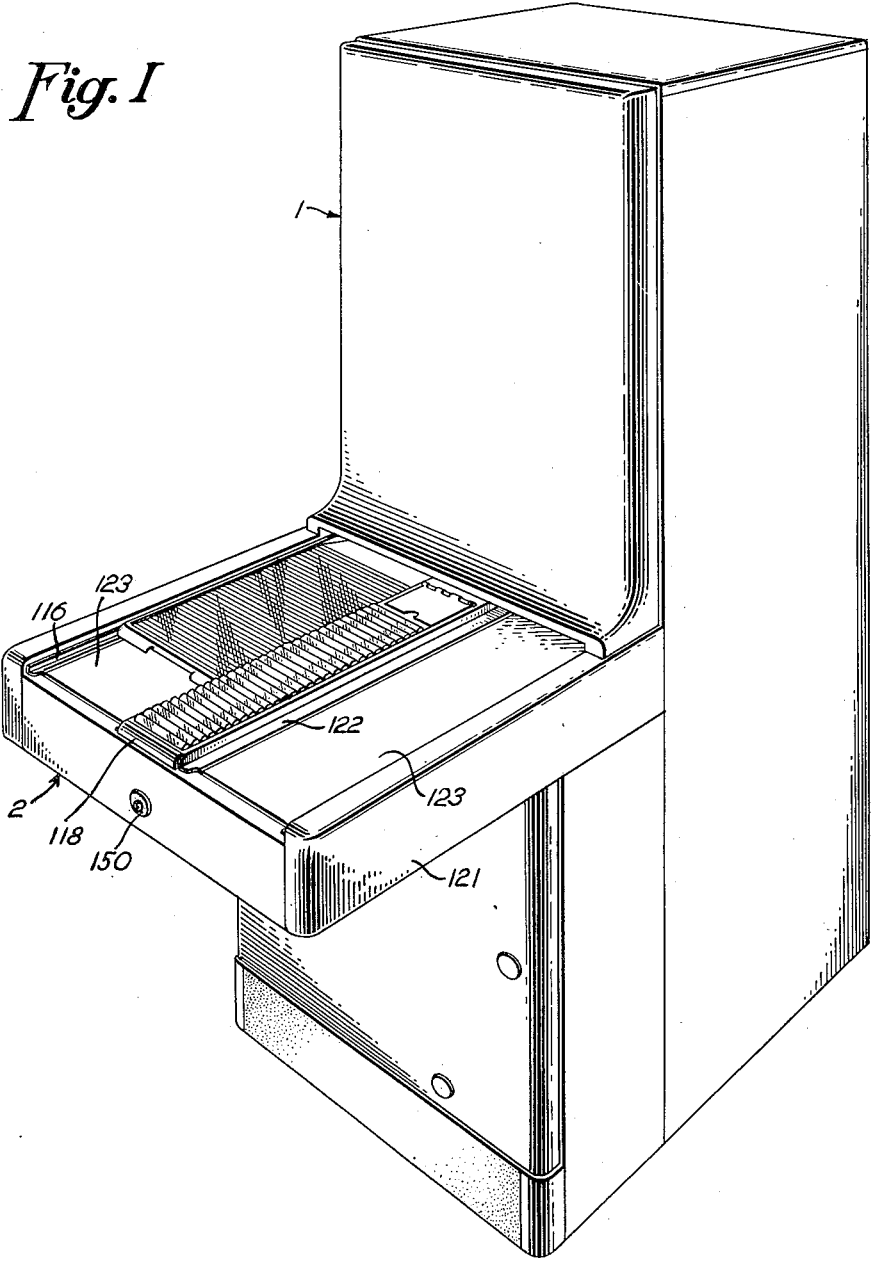
Fig. 1 shows the motor operated visible index unit in perspective, looking from a position to the right, in front and above the unit.

The card index unit is generally indicated at 1, as shown in Fig. 1, having a completely self-contained mechanism comprising the invention in which side, front, rear, bottom and top wall members are applied to a chassis to suitably enclose the unit. A desk extension 2 projects forwardly from housing 1 so that an operator may sit in front of the machine and operate the keys on the keyboard for securing a cycle of operation on the mechanism in the housing to project a selected card index tray onto tray guides mounted on the desk extension to make them available for inspection and record keeping purposes in a convenient manner.

Chassis

Figure 2:
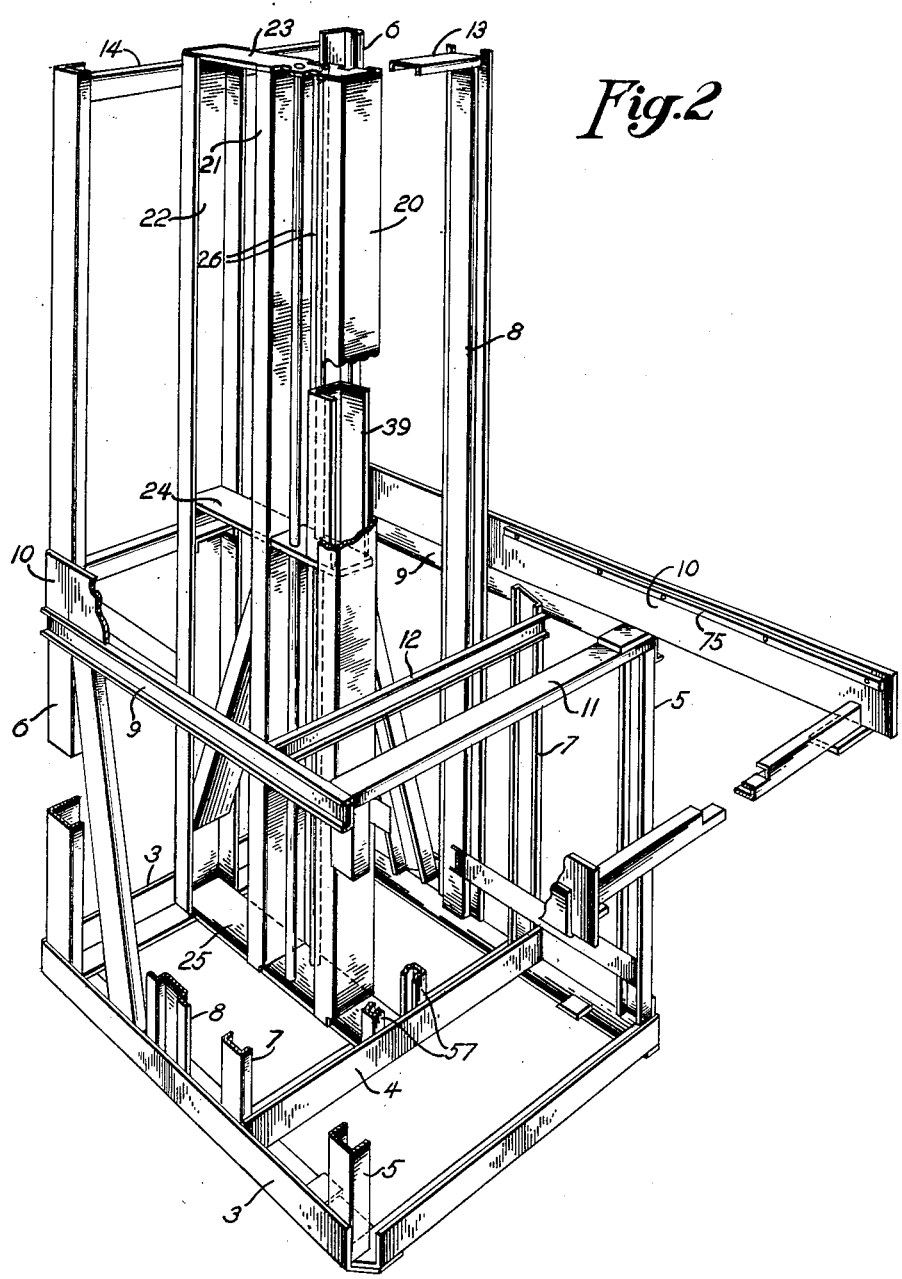
Fig. 2 is a perspective showing the chassis with portions broken away and shown in cross-section for convenience in illustration.

The chassis is illustrated in Figures 2, 3, 7, 8 and 9 with the operating mechanism omitted in the illustration of Fig. 2 in order to show the principal portions of the chasis frame structure. The chassis has a bottom frame 3 comprising front, rear, and side members to form a rectangular bottom frame structure with an intermediate cross frame member 4 in spaced parallel relation to the rear of the front bottom frame bar. The chassis has lower front and rear corner uprights 5 and 6, respectively. Intermediate uprights 7 and 8 respectively are located on opposite sides of the chassis.

Intermediate side channels 9 connect the upper ends of lower front corner uprights 5 at each side of the chassis to rear corner uprights 6 and have intermediate uprights 7 and 8 also rigidly connected thereto. Intermediate side channels 9 are arranged to support desk extension plates 10 at opposite sides of the chassis having the rear ends secured to rear corner uprights 6 while the intermediate portions are secured to intermediate uprights 8 and the forward ends project forwardly beyond lower front corner uprights 5 to provide a supporting frame structure for the desk extension when assembled. A front tie bar extends between the forward ends of desk extension plates 10 to provide a rigid desk extension structure on the chassis for carrying the desk extension assembly.

Intermediate tie bars 11 and 12 connect the upper ends of lower front corner uprights 5 and intermediate uprights 7 respectively, while a suitable intermediate tie bar connects rear corner uprights 6. Top tie bars 13 and 14 respectively connect the upper ends of intermediate uprights 8 and rear uprights 6 at the top of the chassis.

This chassis frame structure is suitably welded or otherwise secured together and may have other reinforcing frame members connecting the several bars herein described and as shown in Fig. 2 for example, to provide a rigid chassis structure for mounting the operating mechanism of the entire index unit assembly to provide a rigid supporting frame for all of the operating mechanism.

Cabinet mounting and guide frame

The chassis includes a cabinet mounting and guide frame structure having front, intermediate and rear channel members 20, 21, and 22, respectively, extending in vertical spaced parallel relation from the bottom to the top of the frame and arranged in longitudinal relation in the center of the frame with the upper and lower ends connected to top, intermediate, and bottom longitudinal tie bars 23, 24, and 25, respectively. This cabinet mounting and guide frame structure is rigidly assembled together and has the top end secured to tie bars 13 and 14 and is mounted at the lower end on bottom cross frame bar 4 and the rear cross member of bottom frame 3.

A pair of shafts 26 extend vertically and are in spaced parallel relation longitudinally of the chassis. Shafts 26 extend through intermediate tie bar 24 and have the upper and lower ends mounted in top and bottom tie bars 23 and 25, respectively. A pair of cabinet carriers 27 are slidably mounted one on each shaft 26 for vertical sliding movement on opposite sides of the guide frame structure formed in part by channel members 20, 21, and 22. Each carrier has a pair of bearing blocks slidably engaged on a shaft 26 carried at opposite ends of carrier bar 28. Cantilever arms 29 extend outwardly from the upper ends of each carrier bar 28 in substantially horizontal relation.

A pair of card index cabinets 30 have an outer sheet metal shell formed with side, top, bottom, and rear walls and open at the front. The cabinet is divided into a plurality of compartments by a plurality of horizontal sheet metal partitions arranged in spaced parallel relation so that a visible card index tray 31 may be slidably mounted in each compartment. Cabinets 30, as shown in the drawings, are constructed to provide thirty compartments for receiving thirty card index trays 31. Cabinets 30 are mounted at opposite sides of upright channel members 20, 21, and 22 with the open ends of the compartments extending forwardly. The central portion of the inner side wall of each cabinet has the side wall suitably secured such as by welding or the like to vertically extending carrier bar 28 in adjacent spaced relation below cantilever arms 29, as clearly shown in the drawings in Figs. 3 and 8, for example. A bolt 32 is secured to the outer side wall of cabinet 30, in vertically extending relation with the upper end projecting above the cabinet through a cross member carried by the outer ends of cantilever arms 29. A nut is threaded on the upper end of each bolt 32 and engages the top portion of the block on cantilever arms 29 to provide an adjustment for the outer side of each cabinet 30 so it may be used to align or level the cabinet compartments.

Cabinet elevator

The cabinet elevator mechanism has an endless chain 35 mounted on an adjustable upper idler sprocket 36 and a lower drive sprocket 37. Sprocket 36 is rotatably mounted on stub shaft 38 having opposite ends adjustably mounted in vertical slotted portions of front channel 20 and a bearing channel 39. Stub shaft 38 can be readily adjusted to provide the desired tension on chain 35 by loosening the bolts engaged with opposite ends of the stub shaft, adjusting the shaft to the desired position and then tightening the bolts.

Chain 35 has a pair of attaching blocks 40 each included in one of the portions of the chain extending between the upper and lower sprockets. Each block 40 has the central portion bolted to carrier bar 28. Opposite ends of each block 40 have apertures for receiving the chain link pivot pins to attach the chains thereto. The apertures for the chain link pivot pins at opposite ends of each block 40 are spaced a different distance from the central aperture for receiving the bolt to attach each block 40 to its corresponding carrier. The difference in the distance of one end aperture from the central aperture relative to the other is preferably equal to one-fourth of the distance between the center lines for the pivot pins of a chain link. By this arrangement the pair of attaching blocks 40 can have the ends interchanged relative to each other in their attachment in chain 35. In one position blocks 40 may be arranged so that the length of the chain is shortened a distance equal to one-half of one link in comparison with the reverse position of the attaching blocks in the chain. Changing the position of just one block 40 will lengthen or shorten the chain between two blocks over the idler sprocket an amount equal to one-fourth of the length of a chain link. This arrangement is used for securing the desired adjustment of the length of chain extending over the idler sprocket between the pair of cabinets so that support of the cabinets by the chain can be adjusted to obtain the proper alignment of each cabinet in conjunction with the adjustment of stub shaft 38 with the tray guides hereinafter described.

Drive sprocket 37 is mounted on elevator drive shaft 44 having the portion adjacent the sprocket supported by bearing member 45 mounted on bottom tie bar 25 while the opposite end is connected to gear reduction drive unit 46 secured to elevator motor 47. Reduction unit 46 and elevator motor 47 are suitably mounted at the bottom front portion of bottom frame 3.

Elevator motor 47 is reversible, adapted to be operated at both slow and high speeds in each direction to change the position of the cabinets by moving them up and down on shafts 26 at opposite sides of front, intermediate and rear channel members 20, 21 and 22, respectively. Gear reduction unit 46 has a beveled pinion on one end of the drive shaft therein so that the beveled pinion carried by manually rotatable elevator shaft 48 may be intermeshed therewith by moving the shaft axially in a suitable supporting frame carried by bottom frame 3. Resilient means engaged between the frame and a collar on shaft 48 normally retains the shaft in a position so that the bevel pinion thereon will not engage the bevel pinion on the gear reduction unit. This manual drive for the elevator mechanism enables the elevator mechanism to be manually operated by a hand crank detachably mounted on the end of shaft 48 whenever power is not available to operate the elevator motor and also for operating the elevator mechanism in lining up the position of the cabinets, the sprockets, and adjusting the chain length.

Guide tracks 54 are mounted on the inner side walls of each cabinet 30 along the front and rear edges thereof in vertical relation. A front guide roller 55 is rotatably mounted in bearing block 56 carried at the upper ends of a pair of vertical spaced parallel channel bars 57 mounted in the central portion of the chassis and having the lower ends secured to the central portion of cross frame bar 4. Opposite portions of the periphery of front guide roller 55 ride on front tracks 54 of the pair of cabinets for fixing the spaced relation of the trays in the cabinets relative to each other. Rear guide rollers 58 are rotatably mounted on supporting blocks 59 hingedly mounted below intermediate tie bar 24 on rear channel member 22. A compression spring 60 engaged between blocks 59 normally separates the blocks and moves rear guide rollers 58 into engagement with rear guide tracks 54. Compression spring 60 has sufficient force to force guide rollers 58 outwardly and move the rear ends of cabinets 30 outwardly until front tracks 54 engage opposite portions of the periphery of front guide roller 55 for holding both cabinets in a desired aligned relation throughout the entire movement of cabinets 30 up and down on the chassis.

Figures 3, 4:
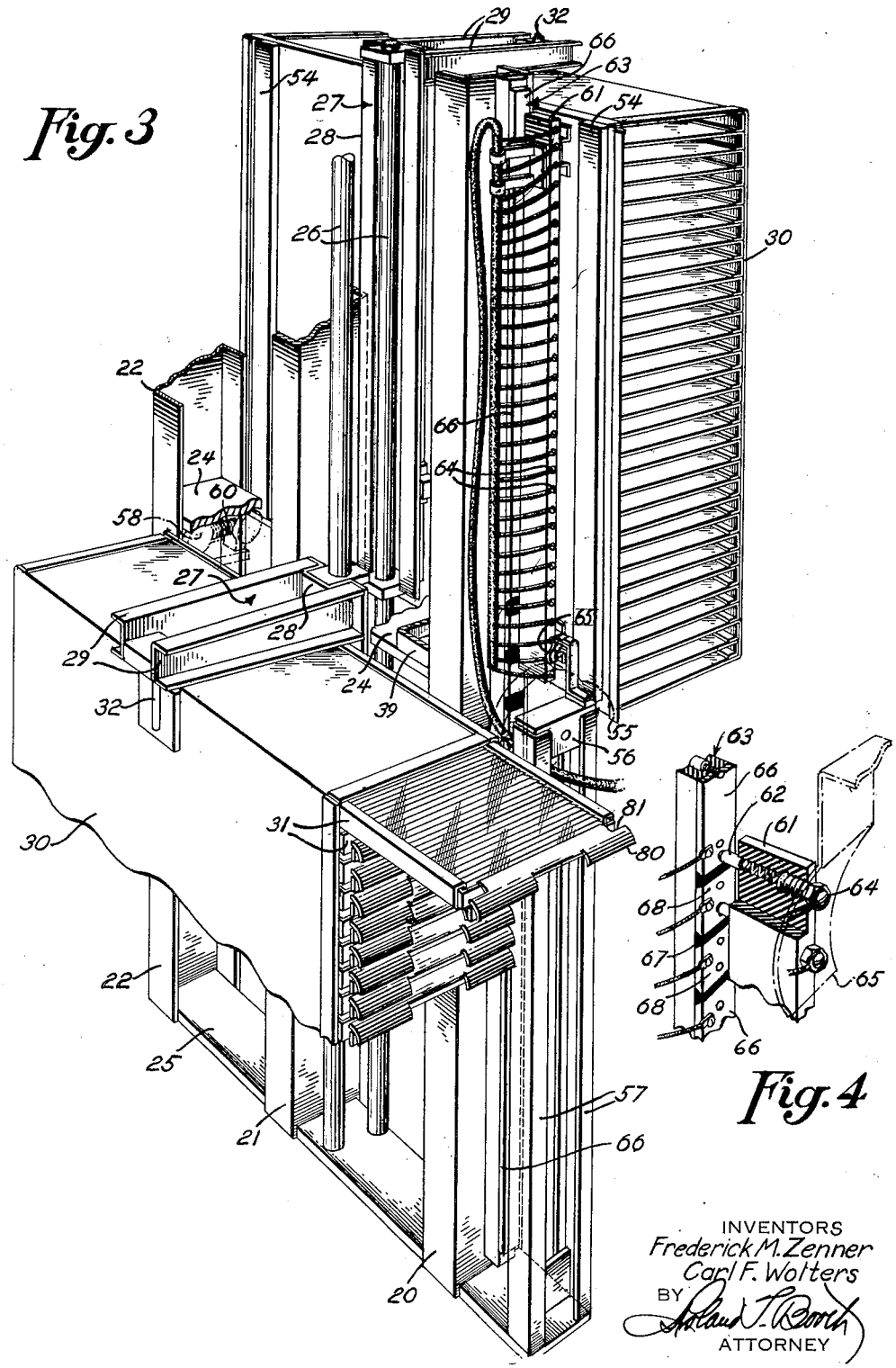
Fig. 3 is a perspective showing the cabinet guiding and mounting portion of the chassis, the slidable mounting structure for the cabinets thereon, the trays being omitted from one cabinet, and being shown in a portion of the other cabinet with one tray partially in projected position.
Fig. 4 is an enlarged detail perspective with portions broken away and shown in cross-section, illustrating a portion of the commutator mechanism.
Figure 9:
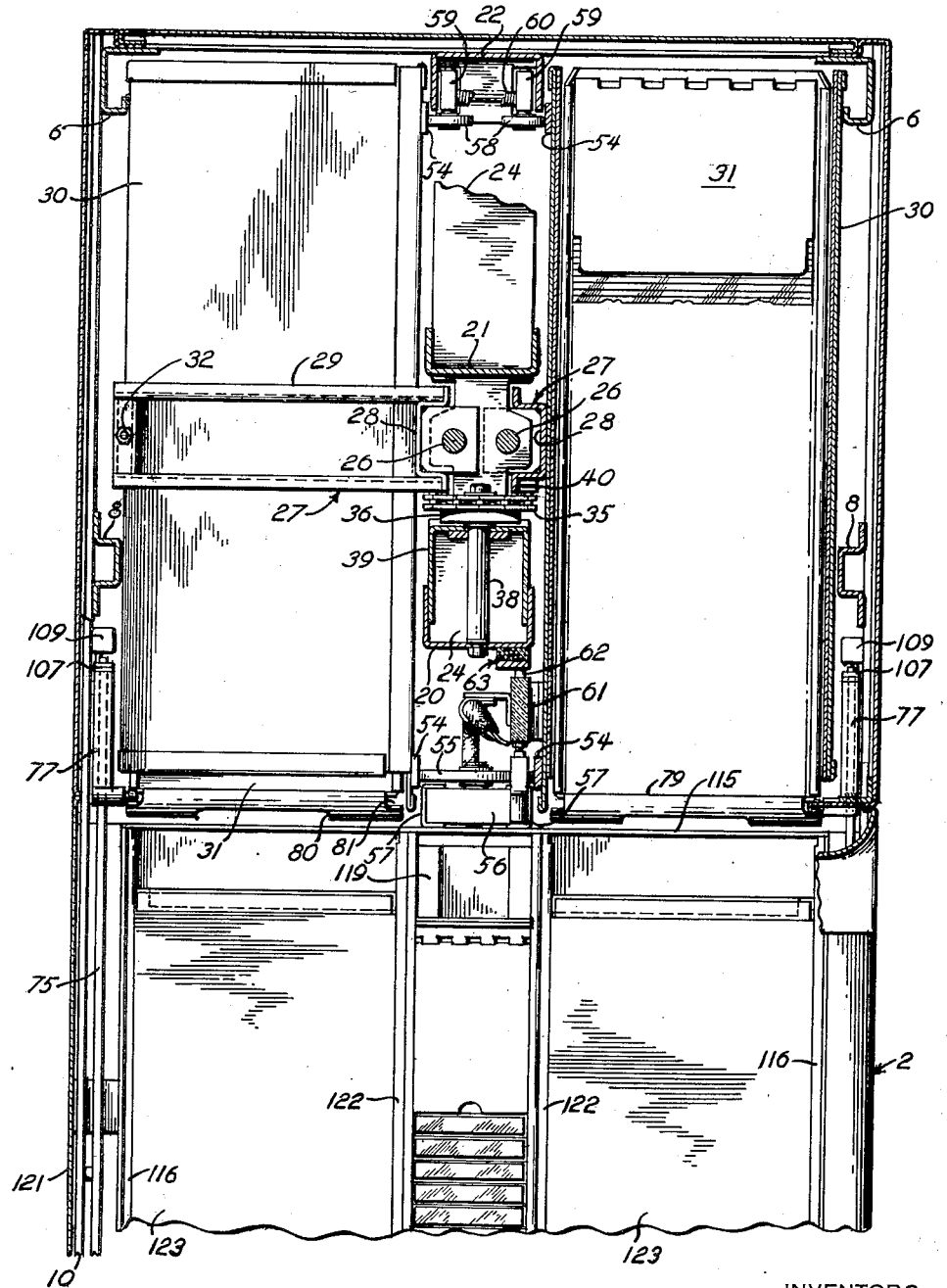
Fig. 9 is a horizontal cross-section taken slightly above the upper chain sprocket for the cabinet carrying chain.

A commutator assembly has a brush holding bar 61 mounted on the front inner side wall of the right-hand cabinet looking from the front of the housing, as illustrated in Figs. 3 and 9. A plurality of commutator brushes 62 equal in number to the compartments in the cabinet are mounted in transversely extending relation in brush holding bar 61 in spaced parallel relation with the brushes projected rearwardly from the rear edge of bars 61 to engage commutator bar 63. The brushes are spring pressed and have terminals 64 on the front edge of the bar for connection of control circuit wires to each of the brushes and also to provide a contact member for engagement with center spring contact 65. Commutator bar 63 is adjustably mounted on and insulated from front channel member 20 in a position so that the entire length of the bar is aligned at all times with brush holding bar 61. Commutator bar 63 has elongated high speed commutator strips 66 at opposite ends while a central insulator 67 is located in the central portion opposite center spring contact 65. Between high speed segments 66 at opposite ends of commutator bar 63 there are two low speed commutator segments 68 arranged in aligned relation with segments 66 on commutator bar 63 and insulated therefrom. This structure of the commutator assembly is clearly shown in Fig. 4. The commutator bar is adjusted to secure the desired stopping position of the elevator mechanism driven by motor 47 through suitable control circuits and relays to be hereinafter described. By adjusting the position of the commutator bar it is, of course, obvious that the position in which the elevator mechanism will automatically stop the movement of the cabinets can be adjusted within desired limits.

Tray operating mechanism

The tray operating mechanism includes independent tray sliding mechanism for the trays in each cabinet. Two such operating mechanisms are provided one for each cabinet each mounted on one of the two desk extension plates 10 and the description of one with the use of corresponding numerals will describe both. The mechanisms are duplicate but constructed in opposite relation to each other.

A guide bar 75 is mounted along the inner upper side of each desk extension plate 10 by a plurality of bolts and spacer sleeves and spaced inwardly therefrom in parallel relation. Guide bar 75 extends from the outer end of each desk extension plate 10 to a position in approximate transverse alignment with front intermediate channel 20, see Fig. 5. A tray carrier 76 is slidably mounted on each guide bar 75 for slidable movement between opposite ends thereof. A tray pusher 77 is detachably mounted on top of tray carrier 76 and has a tray engaging arm projecting inwardly from the forward end carrying roller 78 on the free inner end.

Each card index tray has a front wall 79 formed with a forwardly and downwardly curved front flange 80 formed with recesses 81 at opposite ends, as clearly illustrated in Fig. 6. Recesses 81 in opposite ends of front flange 80 are at the sides of each tray 31 and are formed to allow arm 78 with the roller on the end to clear the front structure on each card index tray 31 so that in the vertical movement of each cabinet with all of the trays in housed position, the trays can move past arms 78 without interference. Yet, in the horizontal movement of tray carrier 76 on guide bar 75, arm 78 will be aligned with the front end portion of front flange 80 and the end portion of front wall 79 to engage and move each tray out of and into its compartment in the cabinet on the tray guides when a tray is properly aligned therewith.

The motor drive for the tray carrier and trays is separate from the motor drive for elevating the cabinets and is operable to selectively reciprocate tray carrier 76 at each side of the housing independently of the other. Each tray carrier has a bifurcated depending projection 82 arranged to receive drive pin 83 on tray carrier operating chain 84, one mounted at each side of the housing. Each chain 84 is mounted over horizontally aligned sprockets 85 rotatably mounted on stub shafts extending inwardly from desk extension plates 10, one at the forward end and the other at a point to the rear of the front end of cabinets 30, as shown in Fig. 5.

Sprockets 85 are positioned below guide bar 75 so the horizontal portion of the chain extending between front and rear sprockets 85 will move drive pin 83 to engage in the bifurcation of projection 82 and during movement of the chain will slide tray carrier 76 back and forth between opposite ends of rail 75. Both front and rear sprockets 85 are formed with a segmental cam 86 on the outer face for cooperation with arcuate ends 87 of depending projection 82 at opposite sides of the bifurcation therein. Cams 86 cooperate with arcuate ends 87 of projections 82 to retain tray carrier 76 at its forward and rear limits of movement against accidental horizontal displacement along guide bar 75 and provides for a limited amount of overtravel of tray operating chain 84 resulting from mechanical operation of the drive by the motor and its controls. Tray operating chain 84 has the lower portion engaged over an adjustably mounted idler sprocket 88 and drive sprocket 89 mounted on one end of tray drive shaft 90, see Fig. 10.

Sprocket 89 at each side of the housing is mounted on one end of drive shaft 90 for relative rotation thereon inside of the rotatable mounting of the drive shaft in suitable bearings carried by desk extension plates 10. Each drive sprocket 89 has an inwardly extending collar carrying a clutch pin 91 adapted to be selectively engaged by clutch pin 92 on longitudinally shiftable clutch collar 93. Two clutch collars 93 are provided, one on each end of shaft 90, clutch pin 92 thereon being on the outer end and the clutch collars being disposed on shaft 90 inwardly with relation to sprockets 89. A guide collar 94 having a key thereon engages in a key way in clutch collar 93 and through its rigid mounting on shaft 90 prevents rotation of clutch collar 93 on shaft 90, but provides for its axial sliding movement on the shaft. Each clutch collar 93 has an annular groove in the inner end for receiving the free end of one of a pair of clutch shifting arms 95 having the opposite end attached to shift bar 96 to provide a rigid U-shaped clutch shifting member operable to shift both clutch collars 93 simultaneously with the movement thereof for moving one clutch collar into operative position to selectively engage and drive one drive gear 89 in the rotation of shaft 90.

A pulley 97 is rotatably mounted on drive shaft 90 between collars 93. A friction ring 98 is fixed on shaft 90 and has a friction washer at one end for engagement with the face of pulley 97 on one side thereof. On the opposite side a slidable friction collar 99 has a friction washer engaged between the end thereof and the opposite face of pulley 97 to provide a friction drive between pulley 97 and shaft 90. Fig. 10 shows these collars and friction washers separated from each other and the pulley in an inoperative position for more clearly illustrating the details of construction. Slidable friction collar 99 is spring actuated by coil spring 100 engaged about shaft 90 between collar 99 and tension adjusting sleeve 101 mounted on shaft 90 and formed of a pair of sections threadedly engaged with one another having the inner section fixed on shaft 90 and the outer section rotatable for threaded movement axially of shaft 90 to adjust the compression tension of spring 100. Spring 100 normally moves collar 99 to engage pulley 97 and retain it in frictional engagement with the friction washers on opposite sides thereof against fixed friction ring 98.

The tray drive motor 102 has a pulley on the armature shaft aligned with pulley 97 to receive drive belts 103. Motor 102 is of the reversible type for rotating shaft 90 in opposite directions in order to drive the selected tray carrier and move a tray into or out of a cabinet. Motor 102 is mounted on frame bars 104, Fig. 7, having the ends secured to intermediate portions of intermediate uprights 7 and the right-hand channel bar 57 at the right-hand side of the chassis. This mounting of motor 102 is about midway between the desk extension and the bottom of the chassis. A suitable bearing frame is also mounted on frame bars 104 to rotatably mount manually operable drive shaft 105 by means of a suitable detachable crank. Shaft 105 can be longitudinally moved in the frame for engaging a bevel pinion on the inner end thereof with a bevel pinion on the armature shaft of motor 102 for manually rotating the motor armature, drive pulley 97 and drive shaft 90 to secure manual operation of a selected tray carrier 76 and move a tray outwardly or inwardly relative to its compartment in the cabinet.

Shift bar 96 is manually operable by shift button 110 accessible at the front of the housing under the desk extension and mounted on a shaft for movement axially in a rearward direction against the tension of a coil spring to engage a shift lever on the rear end with a complementary member on shift bar 96 for operating shift bar 96 to shift one or the other of clutch collars 93 into position for engaging one of the drive sprockets 89 to selectively operate a desired tray carrier.

Manual shift button 97, manually rotatable elevator shaft 48 and manually operable drive shaft 105 are normally spring operated into disconnected relation from the parts which they control in order that there will be no interference with power operation of the respective parts.

A pair of solenoids 106 have their armatures connected with clutch shifting arms 95 and are arranged at opposite ends of the clutch shifting member formed by arms 95 and bar 96 to selectively move the clutch shifting member in opposite directions for selectively shifting clutches 93 to selectively engage one of the drive sprockets 89 and selectively operate one of the tray carriers. The tray carriers, as previously described, are arranged at opposite sides of the housing so that there is a right-hand tray carrier and a left-hand tray carrier to engage and operate a tray from the right-hand cabinet or a tray from the left-hand cabinet. Likewise, solenoids 106 provide right-hand and left-hand solenoids for securing selective operation of clutch collars 93 to select a right-hand or a left-hand tray.

In operation of the tray drive mechanism, a motor 102 will rotate shaft 90 through almost one revolution in each direction before clutch pins 91 and 92 for the selected tray carrier are engaged to start moving the tray carrier either forwardly or rearwardly. When the tray carrier reaches the forward or rear limit of movement on guide bar 75, it will engage a front or rear bumper 107 limiting the forward or rearward movement of the tray carrier in an accurate manner. After the tray carrier has reached the forward or rearward limit of movement on guide bar 75, segmental cam 86 will operate on one of the arcuate ends of the tray carrier to retain it at its limit of movement against the bumper while the motor may coast and have a slight amount of overtravel during which period drive pin 83 may move relative to the tray carrier in the bifurcated portion of projection 82.

When the motor is reversed to move the tray carrier in the opposite direction, drive pin 83 moves into the bifurcated portion of projection 82 while segmental cam 86 moves out of engagement with depending projection 82 so that operating chain 84 will move tray carrier 76 along guide bar 75 to the opposite limit of movement. Each tray carrier 76 operates a pair of switches for controlling the tray drive including front switch 108 and rear switch 109. Two pairs of switches are used, one at each side of the housing for operation by the right-hand or left-hand tray carrier 76. As a tray carrier reaches its limit of movement at the forward or rear ends of guide bar 75 it will operate to close the forward switch 108 or rear switch 109 at the right-hand or left-hand side of the housing according to the direction of movement of the tray carrier.

*Tray guide and button panel assembly*

The tray guides and button panel assembly are mounted in the desk extension between desk extension plates 10 and inside of guide bars 75 and tray carriers 76 together with the tray drive mechanisms so as not to interfere with the tray drive. A channel-shaped supporting bar 115 has the central portion secured to the upper ends of channel bars 57 above intermediate tie bar 12, as shown in Figs. 9, 11, and 12. The outer ends of supporting bar 115 terminate in spaced relation inwardly from guide bar 75 as shown in Fig. 9 and have the ends supported on intermediate tie bar 12 by suitable brackets. Outer tray guides 116 have the front ends secured to the tie bar connecting the front ends of desk extension plates 10 and the rear ends secured to supporting bar 115 in adjacent spaced parallel relation at opposite sides of the desk extension inwardly of guide bars 75 and in horizontal relation in the housing.

The button panel assembly has a channel-shaped housing 117 extending longitudinally in the center of the desk extension with the front end supported on the tie bar connecting the front ends of desk extension plates 10 and the rear end detachably mounted on supporting bar 115. The front end of button panel housing 117 has a front piece 118 mounted in transversely extending relation across the front end with the front edge overhanging or extending beyond the front end of housing 117 as shown in Fig. 11. Button panel housing 117 has inwardly extending top flanges 119 extending along opposite sides of the housing from the front to the rear ends thereof and has depending lips along the inner edges, as shown in Fig. 7 to provide a housing of substantially C-shape in cross-section. Lips 120 are mounted on the forward ends of top flanges 119 and extend forwardly beyond the front edges thereof in spaced relation to the overhanging portion of front piece 118 at opposite sides of the button panel housing.

The desk extension 2 has an outer housing member 121 formed to enclose the desk extension beyond the front and side wall portions of the housing. Outer housing member 121 includes side, bottom and front walls with inturned flanges on the upper edges of the side walls for enclosing desk extension plates 10, extends over the tray carrier mechanism and terminates adjacent the rollers on the ends of arms 78 of the tray pushers, as shown in Fig. 7. The front wall portion of outer housing member 121 has an inturned flange on the upper edge to provide a finished outer casing structure on the desk extension. It is notched at the center portion to receive the front end of button panel housing 117 with a portion of the flange on the upper edge engaged between lips 120 and front piece 118, as shown in Fig. 11. This positions the button panel in the center of the desk extension and provides a detachable connection for the front end to hold it in position while the rear end is bolted to supporting bar 115. A pair of inner tray guides 122 are mounted on opposite sides of button panel housing 117 in opposed horizontal relation to outer tray guides 116 and spaced the proper distance apart to provide for the slidable support of card index trays 31 when they are moved out of a compartment in the housing onto the desk extension for inspection.

Outer and inner tray guides 116 and 122 respectively, at each side of the desk extension are formed with flanges for receiving and supporting center panels 123 at each side of the button panel housing to form a closure to conceal the mechanism in the desk extension which operates the trays.

A plurality of buttons 125 equal in number to the number of trays in both cabinets are mounted in the button panel assembly in two rows, one at each side of button panel housing 117. Top flanges 119 are each formed with a row of keyhole slots arranged in spaced aligned relation from the front end to the rear portion thereof, as shown in Figs. 11 and 12. Each button has an operating pin 126 projecting axially from the bottom thereof and terminating in a tapered lower half. The lower end of operating pin 126 is slidably engaged in an aperture formed in the bottom of button panel housing 117 to slidably mount buttons 125 for vertical movement in the housing. A compression spring is engaged about each operating pin 126 and is seated on the bottom of the button panel housing and against the bottom end of each button 125 for normally moving the buttons upwardly to engage side arm 127 with cushion strip 128 mounted along the under side of the inner edge of top flanges 119.

Figure 13:
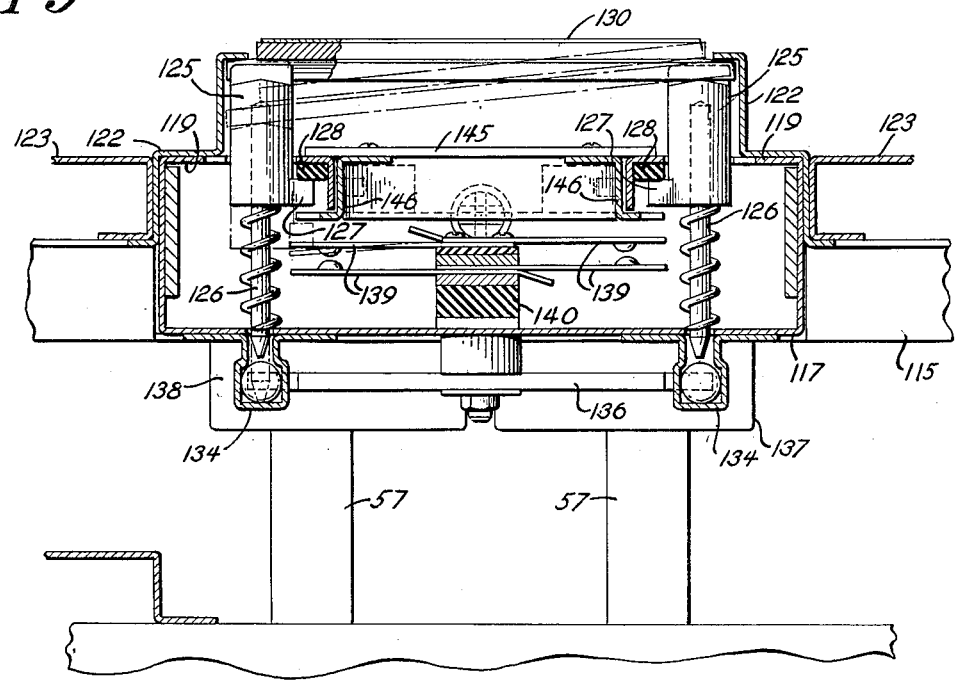
Fig. 13 is a cross-section taken on line 13—13 of Fig. 12.

The upper end of each button 125 has a transverse slot and the buttons at opposite sides of button panel housing 117 are in transversely aligned relation to receive and support opposite ends of index key 130, as shown in Fig. 13. Index key 130 is in the form of an elongated strip extending between opposite buttons 125 on opposite sides of button panel housing 117 with the upper portions at opposite ends constructed to house an index strip for indexing opposite ends of the key to index the contents of each tray corresponding to a button 125. Inner tray guides 122 are formed with flanged portions that cooperate with button panel housing 117 to provide upwardly extending side portions and inwardly extending flanges at the upper edges above housing 117 to enclose button panels 125 and extend over the outer ends of index keys 130 to limit the upward movement of keys 130 at opposite ends and of the respective buttons 125 at opposite sides of the button panel assembly.

Figure 14:
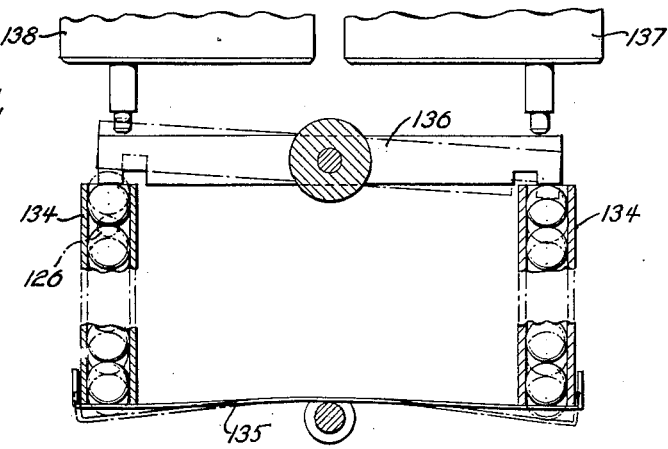
Fig. 14 is a diagrammatic illustration showing how the selector mechanism operates to select a desired tray for delivery to the tray guides of the desk extension.

A pair of ball runways 134 are mounted at opposite sides in depending relation from button panel housing 117 and aligned with the apertures in the bottom of the housing to receive the tapered ends of operating pins 126 at each side of the button panel assembly. Ball runways 134 house a row of balls in longitudinally extending relation therein for longitudinal movement. The balls are arranged to normally have the contacting portion between each pair of balls aligned with the tapered end of each operating pin 126. A leaf spring 135 has its center portion mounted on a stud projecting from the lower front end of button panel housing 117 while opposite ends are extended over the front ends of ball runways 134 to resiliently retain the balls in the runway and normally project them rearwardly to engage opposite ends of switch operating lever 136. Switch operating lever 136 is rotatably mounted on a stud projecting from the bottom central portion of button panel housing 117 at the rear of ball runways 134 and the rear buttons 125, as shown in Fig. 11. Opposite ends of switch operating lever 136 engage the periphery of the rear balls in runways 134 so that any rearward movement of the rear ball in one runway will pivot the lever in one direction and in an opposite direction when the rear ball in the other runway is moved rearwardly. Right and left-hand tray selector switches 137 and 138 respectively, are secured to the under side of button panel housing 117 with the operating arms for the switches projecting forwardly in aligned relation with ball runways 134 to engage the rear sides of switch operating lever 136 at opposite ends, as shown in Fig. 14.

A plurality of pairs of contact arms 139 are carried by an insulated supporting strip structure 140. A pair of contact arms is provided for each tray so that there are as many pairs of contact arms as there are trays in the cabinets. Each pair of contact arms is arranged opposite to one of the buttons 125 so that there are two rows of contact arms 139 extending in opposite directions from center insulating supporting strip 140 in transverse aligned relation toward each button 125 aligned at opposite sides of the button panel assembly. The corresponding contacts of each pair in transverse alignment at opposite sides of supporting strip structure 140 are mounted one upon the other and electrically connected while each contact of the pair is insulated from the other.

The free ends of each pair of contacts on opposite sides of insulating supporting strip structure 140 are in vertical alignment under side arm 127 on the corresponding button 125. This provides an arrangement so that each button 125 may be depressed by manually depressing one end of index key 130 to move the button operated thereby downwardly. Downward movement of a button 125 will engage side arm 127 with the upper contact of a pair 139 and move it downwardly to engage the other contact to close the circuit connected with the pair of contacts. At the same time, the tapered end of operating pin 126 will engage between the pair of balls immediately adjacent the pin and move them forwardly and rearwardly against the tension of spring 135.

The balls to the rear of the operating pin move the corresponding end of switch operating lever 136 rearwardly and operate one of the selector switches 137 or 138 according to the side at which the depressed button 125 is located. This operation is shown in Fig. 14 in diagrammatic form in which a rear button 125 on the left-hand side of the button panel assembly has been depressed to move the balls in ball runway 134 at the left both forwardly and rearwardly to rotate switch operating lever 136 in a clockwise direction and close left-hand tray selector switch 138. The right-hand end of switch operating lever 136 has been moved forwardly to move all of the balls in the right-hand ball runway 134 forwardly against a tension of spring 135. This operation moves all of the balls in both ball runways out of alignment with all of the other operating pins 126 in the button panel assembly to prevent operation of the other buttons and index keys so that only one tray selecting operation can be initiated by operating an index key 30. The engagement of one pair of contacts 139 to close the circuit therewith will operate a relay for securing operation to deliver a selected tray for inspection on the tray guides in the desk extension in a manner that will be described hereinafter in connection with the wiring diagram.

Button locking strips 145 extend between and have opposite ends slidably engaged on the inner edges of top flanges 119 and secured to locking bars 146 depending from the under side thereof and extending longitudinally along the inner edges of top flanges 119, as shown in Fig. 13. Locking bars 146 have outwardly extending flanges below the lower ends of the lips on the inner edges of top flanges 119 formed with slots arranged in aligned relation with side arms 127 on buttons 125 in the inoperative position of locking strip 145, as shown in Fig. 13. In this position of the locking strip and locking bars, side arms 127 are free to pass through the slots to engage and operate contacts 139. However, as soon as a button 125 is depressed side arm 127 will move through the slot in the locking bar 146 so as to extend below the bar.

The bar may then be moved longitudinally a distance sufficient to align the edge of the flange between slots over the side arm on the depressed button and under the side arms on all of the other buttons in the assembly and lock all of the buttons against operation, retaining the depressed button in the operated position. This operation of the locking strip occurs as soon as a button is completely depressed and the electric circuit control mechanism has operated to energize locking solenoid 147. A coil spring operating on the solenoid armature normally returns the locking strips and bars to the inoperative position for releasing all of the buttons for operation, this position being shown in Fig. 12.

Figs. 15, 16 and 17 disclose a slightly modified form of construction to provide for positioning front switches 108 in a position in advance of the terminal portions of guide bars 75. Switches 108, as shown in Figs. 15 to 17, are positioned at a distance to the rear of the front terminal portions and rearwardly of the forward limit of movement of tray carrier 76. Switch 108 is mounted on the bottom flange portion of outer tray guide 116 and has a pivoted arm 148 provided with a roller in the free end projecting into the path of movement of tray carrier 76. As the tray carrier moves to the forward limit of movement it will engage the roller on arm 148 and move it on its pivot to operate switch 108 to the closed position. This occurs before the tray carrier 76 reaches the forward limit of movement so that control of the tray operating motor can be made in advance of the tray carrier reaching the forward limit of movement and by taking advantage of the coasting of the motor and tray carrier after the circuit to the motor is controlled to stop operation thereof and thereby secure a different operating condition from that shown in the previously described arrangement of switch 108 beyond the forward end of guide bars 75.

Operation and wiring diagram

Figure 18:
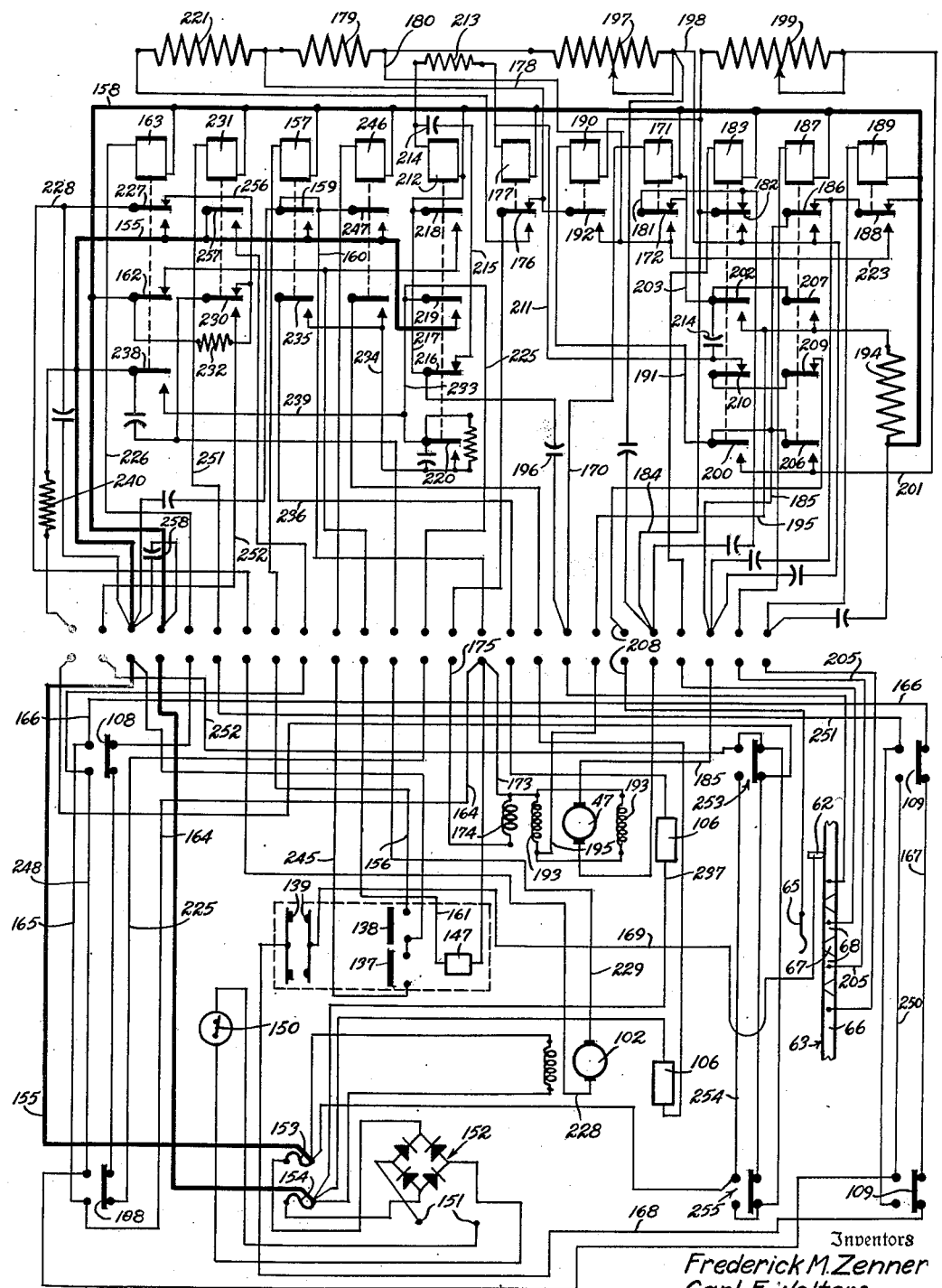
Fig. 18 is a wiring diagram.

Preliminary to the description of the wiring circuits in the diagram shown in Fig. 18, it will be understood that the relays described should be considered as electromagnetically operated switches, which are opened and closed in orderly sequence by push buttons or other switches operated either manually or mechanically.

The cabinet elevator mechanism for moving the cabinets vertically is operated by a direct current motor of suitable horse-power which may be run at high or low speed in one direction or the other by the closing or opening of the relays. The tray carriers are operated by a separate direct current motor of a suitable horse-power which is also controlled as to direction and speed by relays.

Briefly, the direction in which the motor rotates is controlled by the direction of the current flowing in the armature. The speed of a direct current motor is governed by the strength of the direct current flow, this current being controllable by inserting more or less resistance in the armature circuit. Where additional turning effort is required in the elevator mechanism, some of the armature current is by-passed through a parallel resistance path, in addition to the reduction of the armature voltage by series resistance. When the by-passing path is broken, the current is diverted through the armature, causing the motor speeds to increase.

It now seems advisable to state a number of laws which govern the function of direct current motors and relays in order to aid in obtaining a thorough understanding of the operation and circuit arrangements of the invention.

Throughout the description of the operation and circuits it will be assumed that the circuit supply voltage is constant, and that the motor loads are constant. The speed of a direct current shunt or compound motor is directly dependent upon the current flowing in the armature, and inversely to the current flowing in the shunt field. Thus with the motor connected directly to the supply voltage, it will run at rated speed. Inserting a resistance in the armature circuit will reduce the current and, therefore, the motor will run at reduced speed, where it is assumed that rated field current is flowing.

When the shunt field current is increased by the reduction of field resistance, more field current flows and the motor speed is reduced. It may now be stated that the voltage across the armature in the motor is directly proportional to the speed. When, as we have assumed, the supply voltage is constant, the voltage across the armature must also be constant. However, if a small resistor is placed in the armature circuit the voltage appearing across the armature will follow the general rule as stated above; all of the operating voltage appears across the series resistor when the armature is stationary and divides proportionally between resistors and armatures as the speed of the motor increases. The current which flows in a direct current relay coil is proportional directly to the operating voltage and inversely to the resistance in the circuit, including the coil resistance.

The voltage measured across zero resistance which is obtained by a short circuit or by a device which has negligible resistance, is zero. A capacitor or condenser, has a very low resistance until such time that the charging voltage builds up across the capacitor a reverse charge, which opposes the charging voltage and thereby limits the currents. Thus the sudden connection of a capacitor, especially one of higher capacitance, across the coils of a relay constitutes a momentary short circuit. When the capacitor is charged through a relatively high resistance, the time required to build up an opposing voltage is increased. Thus when a relay coil is connected across a direct current line in series with a resistance and in parallel with a capacitor, the voltage appearing across the relay coil will gradually increase from zero to a value that causes the relay to actuate. This is known as a time-delay circuit.

Another characteristic of capacitors is their ability to hold a charge of voltage until it is allowed to dissipate itself through a closed circuit. When the closed circuit, connected across the capacitor, is of relatively high resistance such as that of a direct current relay coil of several thousand ohms, this is not dissipated instantaneously but by following a curve with the same general shape as that of the charging current. Thus a capacitor connected across a relay coil has a fly wheel effect, which keeps the relay actuated for a time after the operating voltage has been disconnected.

Now referring to the circuit diagram in Fig. 18 and also Fig. 1, a key operated switch 150 is mounted in the front wall of desk extension 2 for manual operation to control a circuit from a source of current supply. By manually operating switch 150 to closed position a circuit is closed with a source of electric current supply indicated by terminals 151, usually alternating current, and with a rectifier diagrammatically indicated at 152 which is of conventional form contained in a suitable housing, indicated by the same number in Figs. 5 and 7. This rectifier produces a direct current output for the operation of the motors and relays in securing the desired operation of the unit. The positive terminal of rectifier 152 is connected through a fuse 153 to a positive supply terminal for the control circuits of the unit while the negative terminal of the rectifier is connected through a fuse 154 to a negative terminal for the control circuits of the unit.

Only one set of button operated contacts 139 are shown in wiring diagram Fig. 18 together with the corresponding commutator brush 62, the remaining contacts and brushes being omitted since the operation of one pair of contacts 139 should be sufficient to explain how all operate to control the motor circuits.

With switch 150 closed current supply is ready for use in securing operation in the machine. The operator now selects from the index on the button panel keys, the desired tray and depresses the selected index key to move button 125 downwardly. It is assumed that the selected button key is at the left-hand side of the button panel. This will close left-hand tray selector switch 138 and the upper pair of contacts 139 shown in Fig. 18. Closing of left-hand selector switch 138 connects the positive source of current supply through wire 155 to wire 156 connected to relay 157. The other terminal of relay 157 is connected to the negative current supply terminal through wire 158.

Relay 157 has two armatures that are moved downwardly in the energized position of the relay to close the contacts below the armatures, as shown. As soon as relay 157 is energized current from the positive supply wire 155 passes through upper armature 159 of relay 157 to wire 160 connected with solenoid 147. The opposite side of solenoid 147 is connected to the negative side of the line through wire 161 to wire 158 through relay armature 162 of relay 163 for operating locking bars 146 to lock the actuated key in circuit closing relation and all of the other buttons of unactuated keys in inoperative open position.

At the same time current from wire 155 connected with the positive current supply passing through armature 159 of relay 157 in the energized position thereof to wire 160 also passes through wire 164 to one of the open contacts of right-hand front switch 108, through wire 165 to one of the contacts of left-hand front switch 108, both of these contacts being in the normal position of the switch contacts when they are not operated by a tray carrier. In Fig. 18 the upper switch 108 is the left-hand front switch and the lower on the right-hand front switch as shown. Current then flows through wire 166 to the left-hand rear switch 109, being the upper one as shown. Left-hand rear switch 109 is connected to the rear contacts closed by the tray carrier in the rear position through wire 167 to the right-hand rear switch and the closed rear contacts thereof maintained closed by the tray carrier, then through wire 168 to closed contacts 139, through wire 169 to brush 62 corresponding to the selected tray.

Let us now assume that brush 62 contacts with upper high speed segment 66. This will close a circuit through wire 170 and relay 171 to wire 158 connected with the negative supply terminal. As a result, relay 171 will be energized and armature 172 thereof will be moved to engage the bottom contact. This operation of relay 171 results in closing a circuit from positive wire 155 through armature 159 of relay 157, wire 160, wire 173 to series field 174 of elevator motor 47, through wire 175 to armature 176 of relay 177, to the upper contact engaged by armature 176 in the deenergized position, then through wire 178 to resistor 179, wire 180, the lower contact of armature 172 in the energized position of relay 171, armature 172, then through wire 181 to the deenergized contact engaged with armature 182 of relay 183 to wire 184 connected to the armature of elevator motor 47, through wire 185 to armature 186 of relay 187 to the deenergized contact engaged by armature 186 of relay 187, to armature 188 in the deenergized position of relay 189 to the upper contact engaged by armature 188 of relay 189 in deenergized position and thence to the negative supply terminal through wire 158.

Current now flows in the elevator motor armature in such a direction as to cause the brush holder assembly to move downward with respect to the commutator segment, as soon as the elevator motor armature has started and as it begins to pick up speed a sufficient voltage will then be generated by the increased speed of the armature to energize relay 190. Relay 190 is connected in parallel across the elevator motor armature by having wire 191 connected in circuit with wire 185 and connected to one terminal of relay 190. The other terminal of relay 190 is connected to wire 184 which is in turn connected to the opposite terminal of the elevator motor armature. As soon as relay 190 is energized, it will move armature 192 thereof to engage the bottom contact in the energized position and through wire 180, armature 192 and wire 178 connected to armature 192, resistor 179 will be cut out of the elevator motor series field circuit to cause the elevator motor to operate at full speed.

The elevator motor 47 has a shunt field 193 connected across the direct current line in series with resistor 194 through wire 173, 160 and armature 159 to the positive side of line 155 and by wire 195 to resistor 194 having the opposite terminal connected to wire 158 and the negative side of the line. This resistor is designed to limit the shunt field current to normal value for full speed motor operation.

The motor will operate at high speed until commutator brush 62 disengages high speed segment 66 and rides over the insulator segment at the end thereof on to low speed commutator segment 68. For the brief period that the live brush 62 is riding on the small insulator separating the high and low speed segments 66 and 68 respectively, relay 171 is maintained in an energized condition through the charge on capacitor 196.

This charge is rapidly dissipated and almost immediately that the live brush begins its travel on the low speed commutator segment 68, relay 171 becomes deenergized. Current to the elevator motor armature now flows from the positive supply wire 155 to wire 173, elevator motor series field 174, wire 175, armature 176 to the upper contact engaged by armature 176 in the deenergized position of relay 177, then to armature 192 of relay 190 to the energized lower contact engaged thereby to wire 180 and slow down resistor 197, then through wire 198 to the bottom contact of relay 183 with which armature 182 engages in the energized condition of the relay, from armature 182 through wire 184 to the armature of elevator motor 47, then through wire 185 to armature 186 of relay 187, armature 188 of relay 189 and to the negative current supply through wire 158. Since the armature current has been reduced through high resistance 197 the armature speed is reduced. This speed is further reduced by the connection of resistor 199 in parallel with the armature of motor 47 through closing of relay armature 200 of relay 183 in the energized position thereof to engage the bottom contact. This places resistor 199 in parallel with motor armature 177 through wire 184 connected with one terminal of the resistor and wire 201 connecting the opposite terminal with the bottom contact for engaging armature 200 in the lower energized position of relay 183. Armature 200 is in turn connected to wire 185 and the negative supply wire 158 through armatures 186 and 188. Part of the current may therefore pass through resistor 199 to the negative side of the line instead of through the armature. The speed of the motor is still further reduced by the connection of shunt field 193 simultaneously to the negative side of the line through the engagement of armature 202 of relay 183 in the energized position with the bottom contact establishing a circuit with wire 195 and the wire connection from armature 202 to wire 158 indicated by the number 203. Unless the elevator motor is traveling very slow, which may be the case when it moves from one slide to an adjacent slide only, live brush 62 will travel across insulating segment 67 at the center of the commutator assembly and come to rest on the reverse direction low speed commutator segment 68 before the elevator motor can bring the cabinets to a complete halt.

During the time brush 62 is passing over center insulating segment 67, positive voltage from brush 62 is applied through spring contact 65 to wire 208, thence to armature 209 of relay 187 in deenergized position, to armature 210 of relay 183 in deenergized position to the upper contact thereof and by way of wire 211 to the coil of relay 177. This voltage is also applied simultaneously to the coil of relay 212 through resistor 213. Relay 212 is prevented from becoming energized instantaneously by virtue of the time-delay network consisting of said resistor 213 and capacitor 214. However no such time-delay is provided for energization of relay 177, but a time-delay is provided for the deenergization of relay 177 through the connection of capacitor 224 to the coil of relay 177 through wire 211. The other side of capacitor 224 is connected to the negative side of relay 177 through wire 203 and common connection 158 to the negative side of the line.

This capacitor 224 is of relatively high capacitance so as to maintain relay 177 in energized condition for several seconds, even though the energizing supply voltage is removed therefrom.

This results in energizing relay 187 by having the current from the positive side of the line passing through brush 62, through lower segment 68 to wire 205 connected with one side of the coil of relay 187, while the opposite side is connected to the negative supply source through wire 158. This moves armatures of relay 187 including armature 186 to engage the lower contacts in the energized position. Relay 163 is deenergized through brush 62, disengaging upper slow speed commutator segment 68 after which armatures 182 and 202 will move to the deenergized position in which armature 182 will engage the upper contact in the deenergized position. The circuit through armature 202 will be opened.

The polarity of the voltage across the elevator motor armature 47 is now reversed, the path of current now being through wire 155 to armature 159 in the energized position of relay 157 in which the armature engages the bottom contact. The current then passes through wire 160 to elevator motor series field 174, through wire 175 to armature 176, to the lower contact in the energized position of armature 176 of relay 177 to wire 222, through resistor 221, starting resistor 179, slow down resistor 197 to wire 198 connected with the lower contact engaged by armature 186 in the energized position of relay 187, then through wire 185 to one side of armature 47 and through wire 184 to armature 182 of relay 183 in the deenergized position thereof having contact with the upper contact connected with wire 181. The current then passes through wire 181 to armature 172 of relay 171 and in the deenergized position armature of relay 171, armature 172 engages the upper contact connected by wire 203 with negative supply wire 158.

Speed of the motor is maintained slow by operation of armature 206 of relay 187 to engage the lower contact in the energized position of relay 187 and connect shunt resistor 199 across the armature. Shunt resistor 199 is connected across the armature of elevator motor 47 by wire 201, the circuit extending through the bottom contact to armature 206 and then to wire 185 connected to one side of the armature of elevator motor 47 while the opposite side of resistor 199 is connected through wire 184 with the opposite side of the elevator motor armature. Field resistor 194 is shorted out of the circuit with shunt field 193 through armature 207 of relay 187 engaging the bottom contact in the energized position of the relay, thereby directly connecting shunt field 193 through wire 195 and armature 207 to the negative side of the line through wires 203 and 158.

The armature is now reversed and restarted at slow speed and therefore travels only a short distance as it leaves the lower slow speed segment 68 and travels on to the center insulating segment 67 of the commutator bar when relay 187 becomes deenergized. This condition causes both sides of the elevator armature to be connected to the negative side of the line through wire 203, the upper contact engaged by armature 172 of relay 171 in the deenergized position thereof, through wire 181 to armature 182 of relay 183 in the deenergized position, then through wire 184 and one side of the armature of elevator motor 47. The circuit extends from the opposite side of the armature through wire 185 to armature 186 relay 187 engaging the upper contact in the deenergized position, then to armature 188 of relay 189 engaging the upper contact in the deenergized position and then to wire 158 and the negative supply line.

Since the elevator motor shunt field 193 is still connected across the direct current line, further rotation of the elevator motor armature is strongly opposed by its reaction to the generation of short circuit current by the armature. It thus comes to an abrupt stop. This connection of shunt field 193 across a direct current line is through wires 155, armature 159, relay 157 to wires 160 and 173, to shunt field 193, through wire 195 to resistor 194 and wire 153 to the negative supply terminal. Positive direct current now passes from live brush 62 through spring contact 65 and wire 208 to armature 209 of relay 187 engaging the upper contact in the deenergized position. The circuit then extends from armature 209 through armature 210 of relay 183 engaging the upper contact in the deenergized position of relay 183, then through wire 211, through resistor 213 to the coil of relay 212, the other terminal of the coil of relay 212 being connected to wire 158 and the negative supply. Capacitor 214 is connected in parallel with the coil of relay 212 by having one side connected to one terminal of the coil and the opposite side connected to the other terminal through wire 215 to the contact engaged by armature 216 in the deenergized position of relay 212 and thence through wire 217 to the other terminal of the coil of relay 212.

This time-delay of circuit momentarily prevents the closing of relay 212 to allow the elevator motor armature 47 time to completely stop rotation.

In a matter of possibly one second the voltage charge on capacitor 214 builds up sufficiently to energize the coil of relay 212 which moves armatures 218, 219 and 220 into the energized position for engaging contacts to close the circuits hereinafter described and at the same time moves armature 216 to open the circuit through wires 215 and 217.

The closing of circuits by a movement of armature 219 to the energized position supplies positive current from wire 155 through the armature to wire 225 extending from the armature to the normally closed contact of right-hand and left-hand front switches 108 and then through wire 226 to one terminal of the coil of relay 163 having the opposite terminal connected to the negative supply line through wire 158. This causes relay 163 to become energized and moves armature 227 of relay 163 to disengage the upper contact and engage the lower contact. It also causes armature 162 of relay 163 to move to the energized position disconnecting the circuit normally closed by the relay in the deenergized position connecting solenoid 147 through wire 161 with wire 158. Wire 161 has been connected through movement of armature 218 of relay 212 into the energized position to wire 158, so that solenoid 147 is maintained in an energized condition to maintain the button keys locked in position against operation.

The movement of armature 227 of relay 163 to the energized position supplies positive current from wire 155 to wire 228 connected to one side of tray drive motor 102, the opposite side of the tray drive motor armature 102 being connected through wire 229 to armature 230 of relay 231 in the deenergized position of armature 230. Since relay 231 is deenergized, armature 230 engages the upper contact and closes the circuit through resistor 232 connected to the negative side of the line through wire 158. Simultaneously, the slide selection clutch is shifted by left-hand solenoid 106 which becomes energized by current flowing through wire 155 from the positive side of the line, armature 219 of relay 212 in the energized position in which the armature engages the lower contact, then through wire 233 to armature 220 of relay 212 engaging the bottom contact in the energized position, supplying current through wire 234 connected with the lower contact engaged by armature 235 of relay 157 in the energized position and then through wire 236 to one side of left-hand solenoid 106 having the opposite side connected to the negative side of the line through wire 237.

This shifts clutch 99 at the left-hand end of tray drive shaft 96 to engage clutch pins 91 and 92 and move the left-hand tray carrier 76 from the rear position toward the front on guide bar 75 through operation of tray drive motor 102 and move the tray registered with the left-hand tray guides outwardly thereon. It will be understood that the tray drive motor operates in sequence after the cabinet elevator drive has moved the cabinet to center it according to the position of the commutator bar which has aligned the selected tray with the ends of the tray guides. The selected tray can be moved by the tray drive motor without engaging obstructions of any kind due to the accurate alignment of a selected tray with the tray guides by the control of the commutator mechanism. The tray drive motor will move the tray outwardly on the tray guides out of the cabinet so that the front end will be at the front of the desk extension when tray carrier 76 reaches the front end of guide bar 75 and engages the front bumper on the guide bar at the same time operating front left-hand front switch 108 to disengage the normally closed contacts and engage the front normally open contacts.

As the tray carrier leaves the rear end of guide bar 75, the left-hand rear switch 109 will disengage the rear normally open contacts and move forwardly to close the front normally closed contacts. By relieving pressure on left-hand rear switch 109 so that it moves to close the front contacts as above described, relays 177 and 212 are deenergized so that the armatures thereof move to the deenergized up position. When relay 212 is deenergized it opens the circuit to button locking solenoid 147 through armature 218 disengaging its bottom contact. This results in opening the circuit to relay 157 by the left-hand tray selector switch 138 moving to open position through release of the button held down through the operation of the lock bars controlled by solenoid 147. Relay 163 is held in an energized condition during the travel of the tray carrier from the rear to the forward end of slide bar 75 through armature 238 of relay 163 being in the energized position engaged with the lower contact thereby supplying positive current from wire 155 through armature 238 to wire 239 connected with wire 225. This circuit in turn supplies current through right and left-hand front switches 108 in the normal position closing the rear or right-hand contacts, as shown in Fig. 18, to wire 226 connected with one side of the coil of relay 163 having the other side connected to the negative side of the line through wire 158.

The tray drive motor will now continue to operate and move the tray outwardly to its outer delivered position for inspection, at which point the tray carrier completes its full travel and engages the front bumper and actuates the left-hand front switch 108 to disengage the rear normally closed contacts shown at the right of the switch in Fig. 18 and engage the switch plate to close the front normally open contacts, these contacts being shown at the left in Fig. 18. This opens the circuit to relay 163 so that it becomes deenergized.

Both sides of the tray drive motor armature are now connected directly to the negative line through wire 158 by wire 228 being connected to negative wire 158 through armature 227 of relay 163 in the deenergized position engaging the upper contact closing the circuit through wire 256 to resistor 232 and to wire 158. Wire 229 from the armature of tray drive motor 102 is connected with armature 230 of relay 231 and in the deenergized up position thereof engages the upper contact also closing the circuit through resistor 232 and negative wire 158. Since the field for motor 102 is connected directly across the direct current supply terminals, it acts with the armature to bring the armature to a rapid halt due to the generator action. The operation of left-hand front switch 108 to close the front contacts through its being operated by tray carrier 76 results in all of the relays becoming deenergized restoring the electrical circuits to the starting position with the exception that left-hand front switch 108 is operated by tray carrier 76 to close the front contacts thereof for setting the circuits in a starting position that will secure the return of the projected tray and tray carrier when a selector key has been operated to select another tray for delivery on the tray guides.

After the tray has been inspected, the operator pushes another selector button 130 and it will be assumed that a button on the right-hand side of the button panel is operated to secure the delivery of a tray on the right-hand tray guides. Operation of the selector key will close contacts 139 and operate right-hand tray selector switch 137 to close the circuit therethrough. This operation will first close the necessary circuits to secure operation of the tray drive motor for returning the tray on the left-hand tray guides from the projected position into its compartment in the cabinet before the elevator motor operates to move the cabinets to align the newly selected tray in the right-hand cabinet with the right-hand tray guides.

Pushing the right-hand selector button will close contacts 139, shown at the bottom in Fig. 18, aligned with selector switch 137. This closing of selector switch 137 supplies current from the positive supply terminal through wire 155, switch 137 to wire 245 connected to one terminal of the coil for relay 246, while the other terminal of the coil is connected to the negative supply line through wire 158. Armature 247 of relay 246 moves to energized position engaging the bottom contact and closing the circuit with positive supply wire 155 to supply current through armature 247 to wire 160. This supplies current to solenoid 147 from the positive side of the line while the other terminal of the solenoid is connected through wire 161 with the negative side of the line through armature 162 in the deenergized position of relay 163 and wire 158. The solenoid again operates the locking bars to lock the operated key in the operated position and all of the other keys in the inoperative open position to prevent their operation.

Closing of a right-hand push button and relay 246 becoming energized now energizes relay 231 in which positive current from wire 155 passes through armature 247 of relay 246 engaged with the bottom contact in the energized position, from which the current flows through wire 160 to wires 164, 165 and then through left-hand front switch 108 closing the forward or left-hand contacts thereof, as shown in Fig. 18. The current then flows through wire 248 to one front terminal of the right-hand switch 108, shown in the lower left-hand corner in Fig. 18, to wire 249, thence to the front contact on right-hand rear switch 109 to wire 250, then through switch blades for the left-hand rear switch 109 closing the front contacts in the normal position, shown to the left portion of the switch in Fig. 18. The circuit then extends through wire 251 to one terminal of the coil for relay 231 while the other terminal is connected to wire 158 and the negative side of the line.

Relay 231 now being energized operates the armatures to the energized position engaging the contacts at the bottom, as shown in Fig. 18. This closes the circuit to tray drive motor 102 having wire 229 connected to armature 230 of relay 231 with armature 230 engaging the bottom contact in the energized position to close the circuit through wire 252 connected with one of the left-hand terminals of left-hand slow down switch indicated at 253. Since the left-hand tray carrier has moved to the forward end of guide bar 76 it has disengaged the arm operating this switch and the blade moves from engagement with the right-hand pair of contacts to the left-hand position to close the left-hand contacts, as shown in Fig. 18, thereby closing a circuit through wire 254 to right-hand slow down switch 255 having wire 254 connected to one of the left-hand terminals thereof, as shown in Fig. 18. Wire 254 is then connected to the positive supply terminal. The other side of tray drive motor 102 has wire 228 connected with the negative side of the line through armature 227 of relay 163 which engages the upper contact in the deenergized position to which wire 256 is connected for completing the circuit through resistor 232 to wire 158 in the negative side of the line.

This reverses the direction of movement of the tray drive motor and returns the projected slide into its compartment in the cabinet. Armature 257 of relay 231 in the energized position of the relay engages the bottom contact and supplies positive current from wire 155 to wire 257 connected to one terminal of each of the front switches 108 and to wires 248, 249 and 250. The circuit then extends through the switch blade of left-hand rear switch 109 to wire 251 through the coil winding for relay 231 and then to negative wire 158 and the negative side of the line. This maintains relay 231 energized after tray drive motor moves the left-hand tray carrier rearwardly with the tray in replacing the projected tray in the cabinet and after the carrier has disengaged the left-hand front switch 108 permitting the blade of the switch to move from engagement with the front contacts, shown at the left-hand side of Fig. 18, to close the rear contacts thereof, as shown at the right-hand side of the diagrammatic illustration of the switch in Fig. 18.

As the tray carrier pushes the tray into the cabinet it engages the movable arm of left-hand slow down switch 253 and moves the switch blade from engagement with the left-hand contacts, as shown in Fig. 18, to engage the right-hand contacts thereof. This opens the direct connection to tray drive motor armature 102 through wire 254, this connection now being through wire 241 and through resistor 240 to positive wire 155 causing the tray motor to reduce speed and continue rearward movement of the tray and tray carrier to complete movement of the tray into the cabinet. The tray carrier will engage left-hand rear switch 169 as tray movement is completed for moving the contact blade thereof from engagement with the front contacts at the left in Fig. 18 to engage the rear contacts shown at the right in Fig. 18. Tray motor operation is then complete and the circuits are then restored to the original starting position so that the elevator motor control circuits will be operated as above described to move the cabinets to center the newly selected right-hand tray with the tray guides and move the tray onto said guides.

A capacitor 258 is connected across the rectified current supply for operation with the rectifier to maintain a higher average direct current voltage in a manner well known in the art. Several other capacitors are shown connected across relay contacts for suppressing arcs as the armatures disengage their contacts in relay operation, this expedient also being of conventional character.

The two rows of terminals interposed in the center of the diagram in Fig. 18 extending transversely across the drawing show how all the relays, capacitors and resistors may be mounted on a relay panel in unit form and then having the remaining circuit connections extended from the motors, switches and current supply connected with the panel terminals. This simplifies assembly and servicing of the electrical equipment.

The invention claimed is:

1. A power operated visible index unit comprising a cabinet having a plurality of compartments in vertical alignment, means mounting said cabinet for vertical movement, a desk extension carried by said means in front of said cabinet having tray guides, a plurality of card index trays each mounted for sliding movement into and out of one of said compartments, separate motor drives adapted to move said cabinet vertically on said means and move a selected tray horizontally out of and into a compartment in said cabinet on said tray guides, control means having a keyboard with a tray identifying key for each tray and selector means sequentially controlling said motor drives to return a tray from said tray guides to its compartment and subsequently moving said cabinet to align a selected tray with said tray guides for delivery onto said guides from the cabinet whenever a key is operated.

2. A power operated visible index unit comprising a chassis having vertical cabinet and horizontal tray guides, a pair of cabinets vertically slidable on said cabinet guides with the fronts at the rear of said tray guides, a plurality of card index trays each slidable in one of a plurality of compartments in said cabinets, means for aligning said cabinets on said cabinet guides to position any tray in aligned relation with a tray guide, separate motor drives for moving said cabinets on said cabinet guides and said trays on said tray guides, selector means operable to sequentially control said motor drives to retain one of said drives inoperative while the other is operative, tray control means controlling the motor drive for moving a selected tray in either of said cabinets on to a tray guide after the cabinet motor drive has moved the cabinets to align a selected tray with the tray guide and a keyboard having a key for each tray operable to control said selector means, motor drives and tray control means and operable to select and secure operation of said motor drive means to deliver a selected tray on said tray guides for reference.

3. A power operated visible index unit comprising a pair of cabinets mounted for vertical movement in adjacent relation, a motor operated drive for moving said cabinets simultaneously in opposite directions, a plurality of card index trays each slidable in a compartment in one of said cabinets, a pair of tray guides, one in front of each cabinet, a motor drive selectively operable to move a selected tray from one of said cabinets onto an aligned tray guide, a keyboard having a key for each tray, and control means for both of said motor drives operated from said keyboard upon operation of a key to selectively operate said motor drives for returning a tray from said tray guides to its compartment in a cabinet, moving said cabinets to align a tray selected by operation of its corresponding key with the tray guide in front of the cabinet and move the tray out of the cabinet onto the tray guides.

4. A power operated visible index unit of the character set forth in claim 1 wherein the motor drive for moving the cabinet has selectively operable automatic means controlled by movement of the cabinet to stop movement of the cabinet at fixed position for aligning a selected tray with its tray guide by moving the cabinet vertically in both directions in accurately finding the tray aligning position.

5. A power operated visible index as claimed in claim 2 wherein means operates in combination with a selected key operation and the cabinet motor drive to center the position of the cabinet for a selected tray with the tray guides by movement of the cabinet in both directions past the centering position in accurately locating the cabinet in the centered position.

6. A power operated visible index unit, as claimed in claim 2, wherein a commutator bar is mounted on said cabinet guides and is formed with a plurality of segments operable with a selected contact member engaged therewith to control the operation of the cabinet elevator motor to accurately align a selected tray with the tray guides.

7. A power operated visible index unit, as claimed in claim 2, wherein a commutator bar is mounted on said cabinet guides and is formed with a plurality of segments operable with a selected contact member engaged therewith to control the operation of the cabinet elevator motor to accurately align a selected tray with the tray guides and control means for starting the tray drive motor when the cabinet and a selected tray has been centered with said tray guides.

8. A power operated visible index unit, as claimed in claim 2, wherein automatic control means operates to retain said tray control and tray drive means in an inoperative position during operation of said cabinet motor drive and vice versa.

9. A power operated visible index unit, as claimed in claim 2, wherein said automatic control means has separate tray motor drive and cabinet motor drive controls each of which includes means for controlling the other to maintain operation of one of said motor drives while the other is maintained at rest and for starting the motor drive at rest upon completion of a cycle of operation by said one motor drive in operation in delivering a selected tray for inspection.

10. A power operated visible index unit, as claimed in claim 2, wherein said automatic control means locks the keys of said keyboard against operation after initial operation of a selected key until a cycle of operation has been completed to deliver a selected tray.

11. A power operated visible index unit, as claimed in claim 2, wherein means is operated by movement of a tray carrier for cooperation with said control means and keyboard for automatically determining the direction of movement of a tray carrier in both directions.

12. A power operated visible index unit, as claimed in claim 2, wherein means is operated by movement of a tray carrier for cooperation with said control means and keyboard to automatically determine direction of tray movement by said tray drive motor, and selectively operated means cooperates with said last-mentioned means to select one of a pair of tray carriers for operation.

13. A power operated visible index unit, as claimed in claim 2, wherein said control means includes means for operating said tray drive motor and cabinet motor drive at high speed until the end of a cycle of operation thereof is approached and automatically slowing motor operation before and until the end of the operation is reached, said last-mentioned means operating automatically and independently of the keyboard control.

14. A power operated visible index unit, as claimed in claim 1, wherein a cabinet mounting and guide frame has a vertical shaft slidably mounting a carrier, said cabinet being adjustably secured to the carrier for adjustment to align the compartments with the tray guides.

15. A power operated visible index unit, as claimed in claim 1, wherein a cabinet mounting and guide frame carries a vertical shaft, a carrier slidable on said shaft, means suspending said cabinet from said carrier adjustable to position said compartments to selectively align each tray in one of said compartments with said tray guides when a selected compartment is in position opposite said tray guide.

16. A power operated visible index unit, as claimed in claim 1, wherein a cabinet mounting and guide frame carries a vertical shaft, a carrier slidable on said shaft, means adjustably mounting said cabinet on said carrier for alignment of the compartments selectively with said tray guides, an endless chain mounted on sprockets rotatable on said guide frame, and attaching means carried by said chain secured to said carrier for mounting said cabinet in said chain.

17. A power operated visible index unit, as claimed in claim 1, wherein a cabinet mounting and guide frame carries a vertical shaft, a carrier slidable on said shaft, means adjustably mounting said cabinet on said carrier for alignment of the compartments selectively with said tray guides, an endless member mounted for linear movement on rotatable means carried by said frame, means attaching said carrier to said chain, and roller guide means on said guide frame guiding said cabinet in movement on said frame.

18. A power operated visible index unit, as claimed in claim 1, wherein a guide bar is mounted in the desk extension parallel to the tray guide, a tray carrier slides on said guide bar and has a tray engaging arm and a lineally movable member mounted on said desk extension has means engaging said tray carrier for moving said tray carrier on said guide bar in operation of one of said motor drives connected for moving said lineally movable member.

19. A power operated visible index unit, as claimed in claim 1, wherein a guide bar is mounted in the desk extension parallel to said tray guide, a tray carrier slides on said guide bar and has a tray engaging arm, a lineally movable member is mounted for movement on said desk extension adjacent said guide bar on at least a pair of rotary members, said lineally movable member having a connection for moving said tray carrier on said guide bar, and cam means on said rotary members for engaging said tray carrier at opposite ends of said guide bar and retain said carrier at the end of said guide bar.

20. A power operated visible index unit, as claimed in claim 1, wherein a guide bar is mounted in the desk extension parallel to said tray guide, a tray carrier slides on said guide bar and has a tray engaging arm, means driven by one of said motor drives connected to said carrier for moving it along said guide bar, a tray engaging arm on said carrier for engaging and moving a tray on said tray guides, and means operated by said tray carrier at the end of travel of said carrier on said guide bar controlling and limiting operation of said one of said motor drives.

21. A power operated visible index unit, as claimed in claim 1, wherein a plurality of buttons operated by the keys in said keyboard control the selection of a tray in said cabinet, a plurality of contacts one for each button cooperate in tray selection and operation, and button actuated means locks all buttons against operation until a cycle of operation initiated by one button is completed.

22. A power operated visible index unit, as claimed in claim 1, wherein a plurality of buttons operated by said keys are movably mounted in said keyboard, each button controlling an individual tray selection mechanism to secure the delivery of a selected tray on said tray guides, and latch means locking all buttons against operation during a cycle of operation initiated by operation of a selected key.

23. A power operated visible index unit, as claimed in claim 2, wherein said keyboard includes a plurality of buttons corresponding in number to the keys and each actuated by one key, each button operating a contact to close a circuit for selecting a tray for automatic delivery, a pin for each button operated thereby, each pin engaging and operating a selector switch cooperating in controlling selection of a tray with said contacts.

24. A power operated visible index unit, as claimed in claim 1, wherein means operated by each of said keys to lock said keyboard and keys against further operation until a cycle of operation initiated by one of said keys is completed.

25. A power operated visible index unit, as claimed in claim 1, wherein a plurality of contacts one for each key are key actuated to initiate a tray selection cycle of operation and means simultaneously operated with said contacts to lock said keys against subsequent operation until a selected tray has been delivered on to said tray guides.

26. A power operated visible index unit, as claimed in claim 1, wherein means operated when a tray reaches its projected position in said tray guides to stop said motor drives and reset the control means for subsequent cycle of operation initiated by manual operation of a key.

FREDERICK M. ZENNER.
CARL F. WOLTERS.

REFERENCES CITED

The following references are of record in the file of this patent:

UNITED STATES PATENTS

| Number | Name | Date |
|---|---|---|
| 1,204,567 | Harnesberger | Nov. 14, 1916 |
| 2,270,896 | Rippon | Jan. 27, 1942 |
| 2,386,520 | Watson et al. | Oct. 9, 1945 |
| 2,504,629 | Bertello | Apr. 18, 1950 |